(12) United States Patent
Van Blarigan

(10) Patent No.: US 6,199,519 B1
(45) Date of Patent: Mar. 13, 2001

(54) FREE-PISTON ENGINE

(75) Inventor: Peter Van Blarigan, Truckee, CA (US)

(73) Assignee: Sandia Corporation, Alburquerque, NM (US)

( * ) Notice: Subject to any disclaimer, the term of this patent is extended or adjusted under 35 U.S.C. 154(b) by 0 days.

(21) Appl. No.: 09/104,895

(22) Filed: Jun. 25, 1998

(51) Int. Cl.[7] .................................... F02B 71/00
(52) U.S. Cl. ........................ 123/46 R; 123/46 A
(58) Field of Search ................... 123/46 R, 46 A

(56) References Cited

U.S. PATENT DOCUMENTS

| | | |
|---|---|---|
| 1,785,643 * | 12/1930 | Noack et al. ............... 123/46 E |
| 2,091,547 | 8/1937 | Jalbert . |
| 2,814,551 | 11/1957 | Broeze et al. . |
| 2,944,535 | 7/1960 | Fikse . |
| 2,963,008 | 12/1960 | Waldrop . |
| 3,089,305 | 5/1963 | Hobbs . |
| 3,105,153 * | 9/1963 | James ........................... 290/1 |
| 3,159,149 | 12/1964 | King et al. . |
| 3,214,085 | 10/1965 | Boldt . |
| 3,370,576 | 2/1968 | Huber . |
| 3,643,638 * | 2/1972 | Braun ........................ 123/46 R |
| 3,665,896 * | 5/1972 | Crehore ........................ 123/1 A |
| 3,675,031 | 7/1972 | Lavigne . |
| 3,693,604 | 9/1972 | Horan . |
| 3,986,796 | 10/1976 | Moiroux . |
| 4,013,048 | 3/1977 | Reitz . |
| 4,036,018 * | 7/1977 | Beale ............................ 60/520 |
| 4,112,683 | 9/1978 | Bess . |
| 4,128,083 | 12/1978 | Bock . |
| 4,185,597 | 1/1980 | Cinquergrani . |
| 4,242,993 | 1/1981 | Onishi . |
| 4,271,793 | 6/1981 | Valdespino . |
| 4,308,720 | 1/1982 | Brandstadter . |
| 4,326,380 | 4/1982 | Rittmaster et al. . |
| 4,362,477 | 12/1982 | Patten . |
| 4,369,021 | 1/1983 | Heintz . |
| 4,403,153 | 9/1983 | Vallon . |
| 4,450,685 | 5/1984 | Corey . |
| 4,462,345 | 7/1984 | Routery . |
| 4,480,599 | 11/1984 | Allais . |
| 4,511,805 | 4/1985 | Boy-Marcotte et al. . |
| 4,516,540 | 5/1985 | Nerstrom . |
| 4,532,431 * | 7/1985 | Iliev et al. .................. 123/46 R |
| 4,623,808 * | 11/1986 | Beale et al. ..................... 310/15 |
| 4,642,547 * | 2/1987 | Redlich ........................... 310/15 |
| 4,649,283 * | 3/1987 | Berchowitz et al. ............ 60/520 |
| 4,776,166 | 10/1988 | Dixon . |
| 4,876,991 * | 10/1989 | Galitello, Jr. .................. 123/46 E |
| 4,924,956 * | 5/1990 | Deng et al. .................. 123/46 R |
| 5,002,020 * | 3/1991 | Kos .............................. 123/46 E |
| 5,117,800 | 6/1992 | Watson et al. . |
| 5,180,939 * | 1/1993 | Rosswurm ...................... 60/520 |
| 5,203,288 | 4/1993 | Melchoir et al. . |
| 5,329,768 * | 7/1994 | Moscrip ......................... 60/520 |
| 5,666,923 | 9/1997 | Collier, Jr. et al. . |

* cited by examiner

Primary Examiner—Willis R. Wolfe
Assistant Examiner—Jason Benton
(74) Attorney, Agent, or Firm—Burns, Doane, Swecker & Mathis, L.L.P.

(57) ABSTRACT

A combustion system which can utilize high compression ratios, short burn durations, and homogeneous fuel/air mixtures in conjunction with low equivalence ratios. In particular, a free-piston, two-stroke autoignition internal combustion engine including an electrical generator having a linear alternator with a double-ended free piston that oscillates inside a closed cylinder is provided. Fuel and air are introduced in a two-stroke cycle fashion on each end, where the cylinder charge is compressed to the point of autoignition without spark plugs. The piston is driven in an oscillating motion as combustion occurs successively on each end. This leads to rapid combustion at almost constant volume for any fuel/air equivalence ratio mixture at very high compression ratios. The engine is characterized by high thermal efficiency and low $NO_x$ emissions. The engine is particularly suited for generating electrical current in a hybrid automobile.

31 Claims, 16 Drawing Sheets

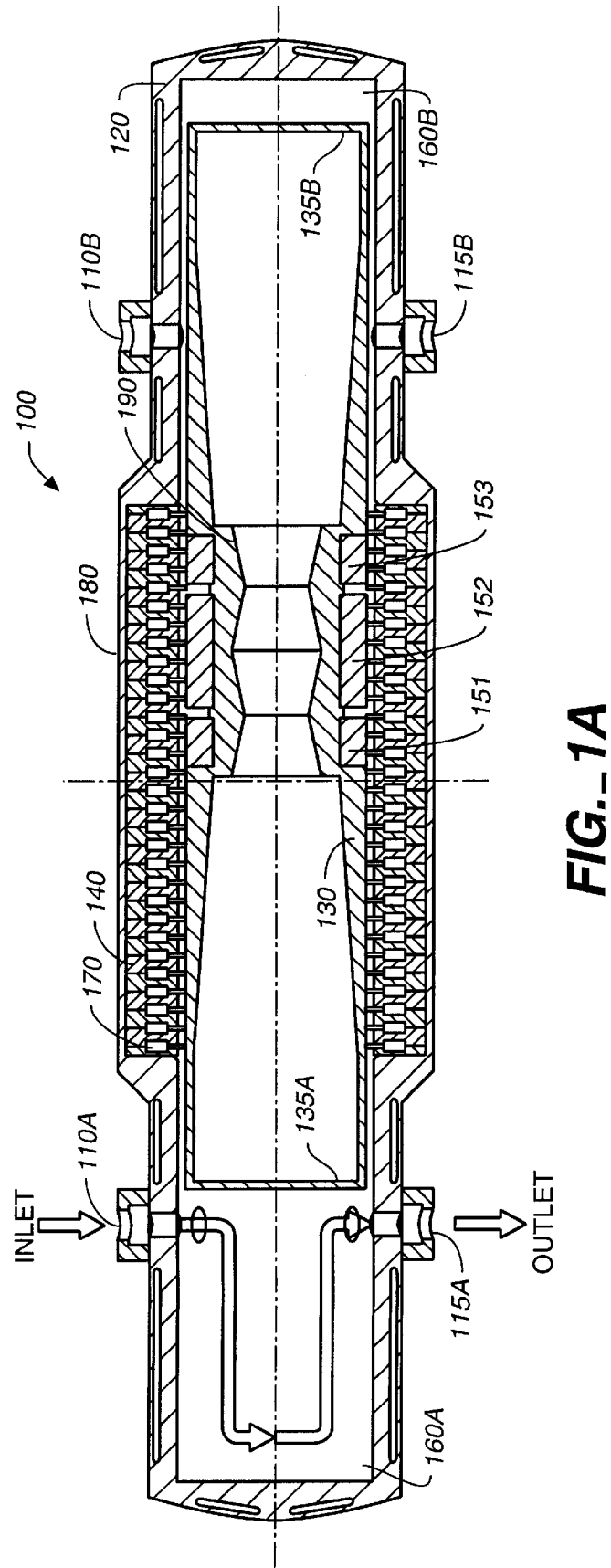
FIG._1A

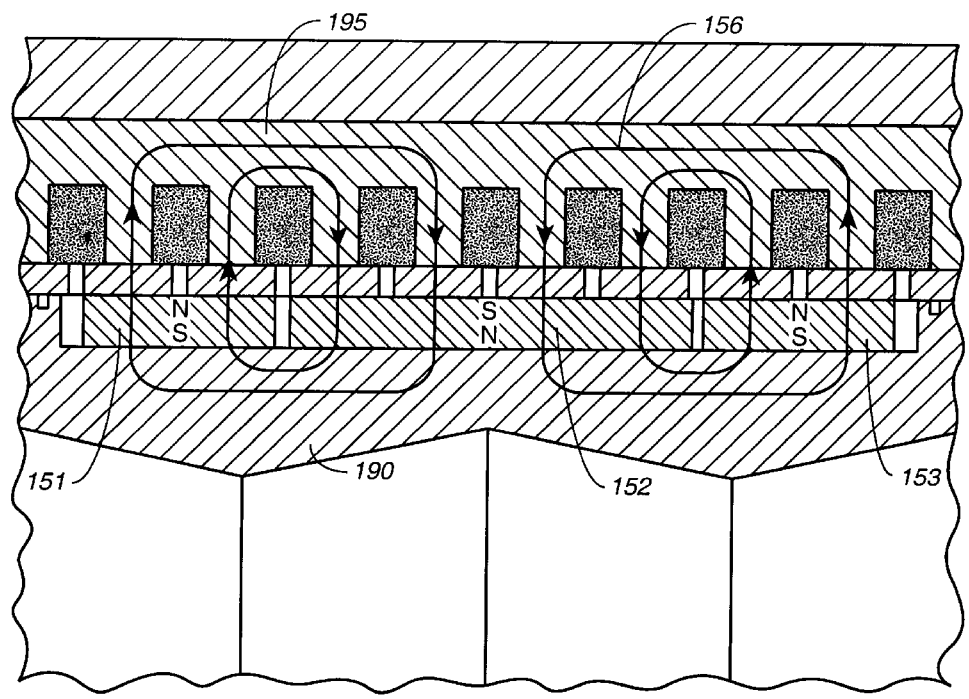
FIG._1B
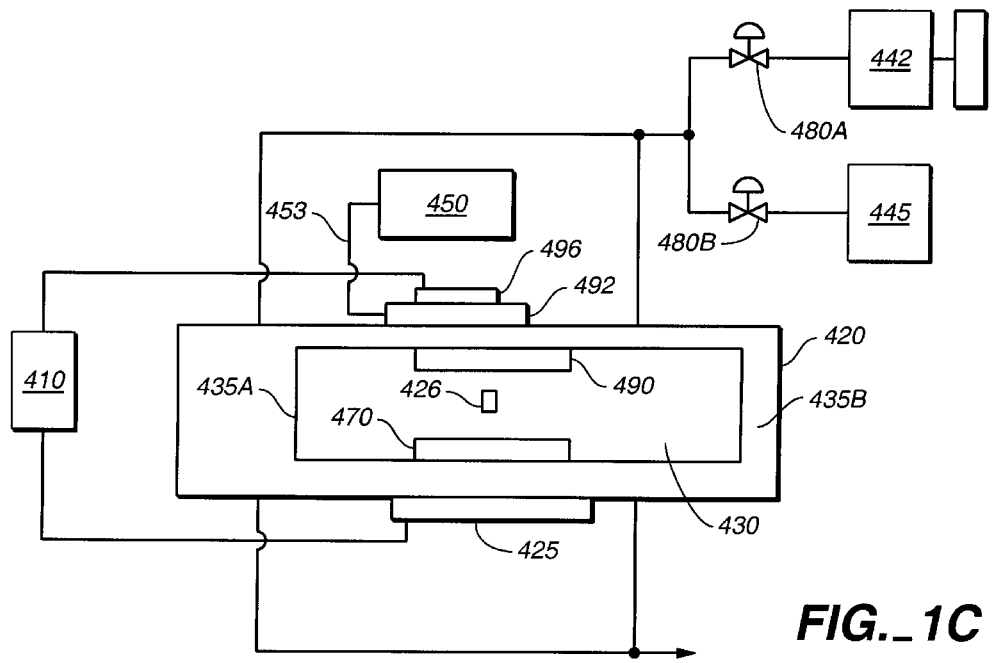
FIG._1C

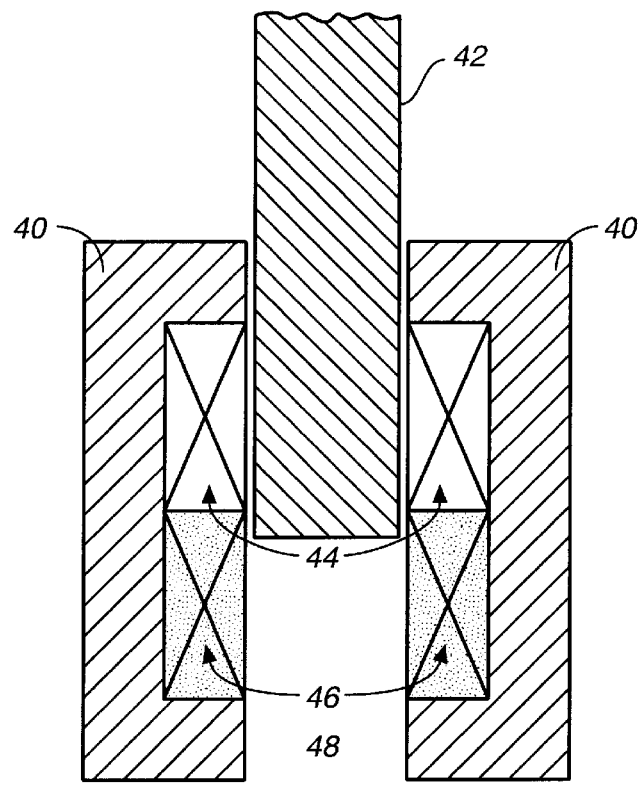
FIG._2A
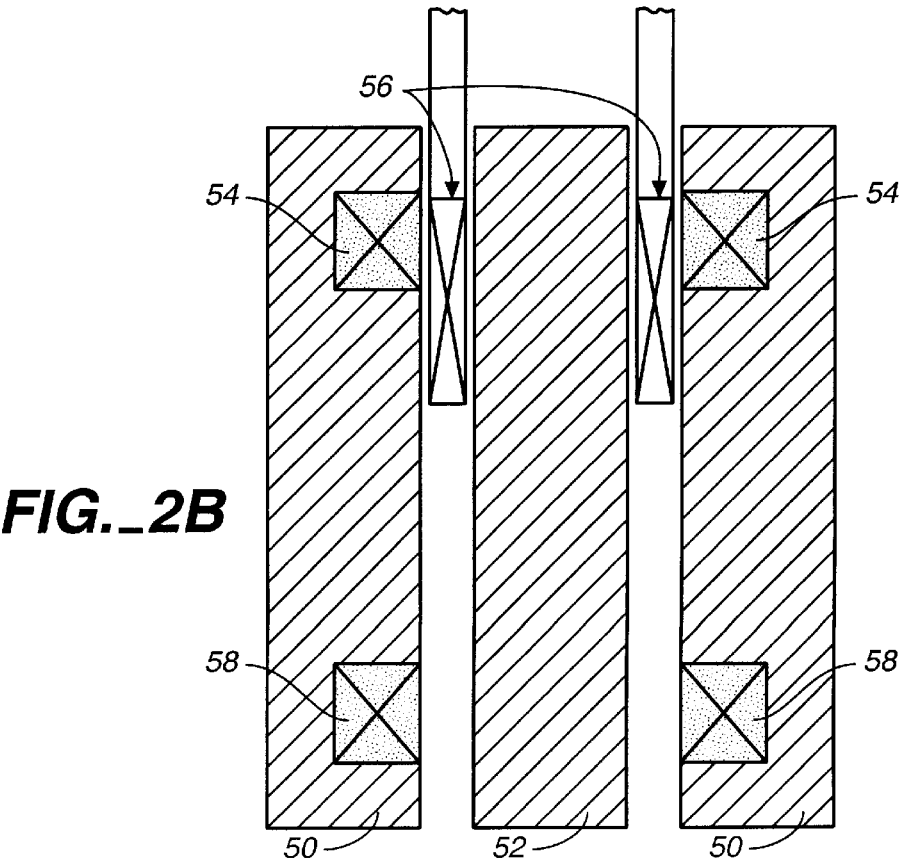
FIG._2B

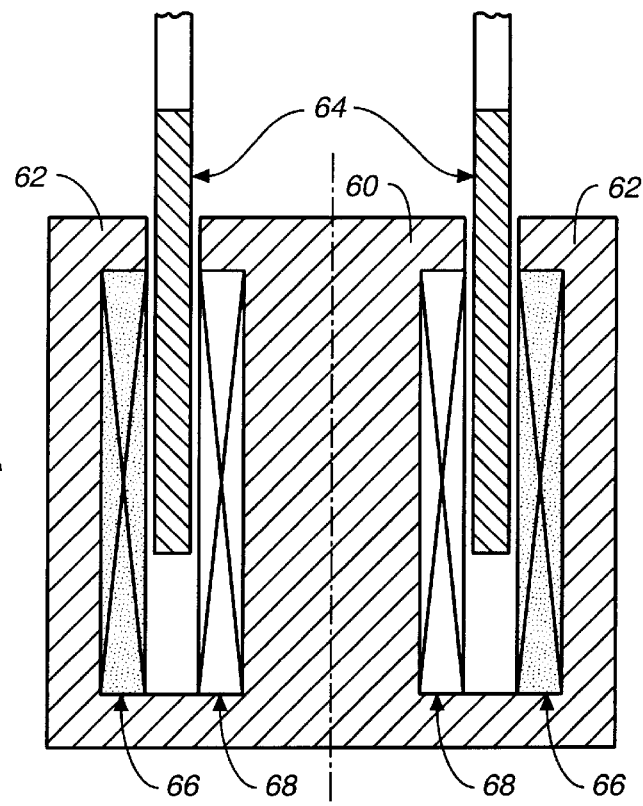
FIG._2C
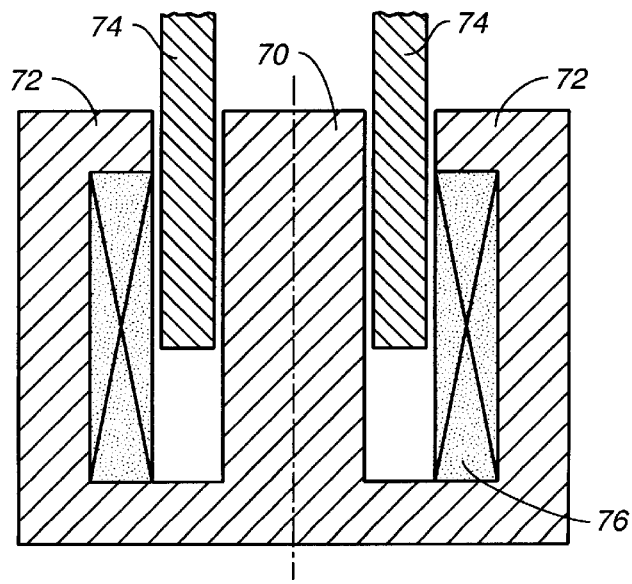
FIG._2D
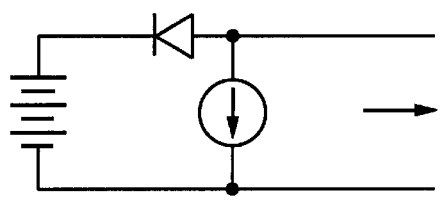
FIG._2E

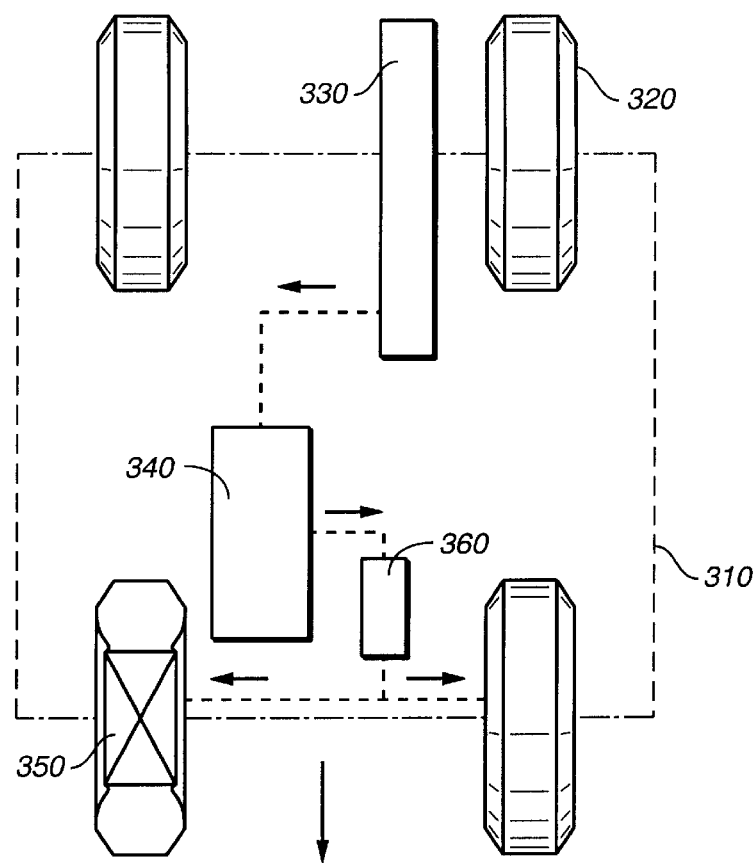
FIG._3
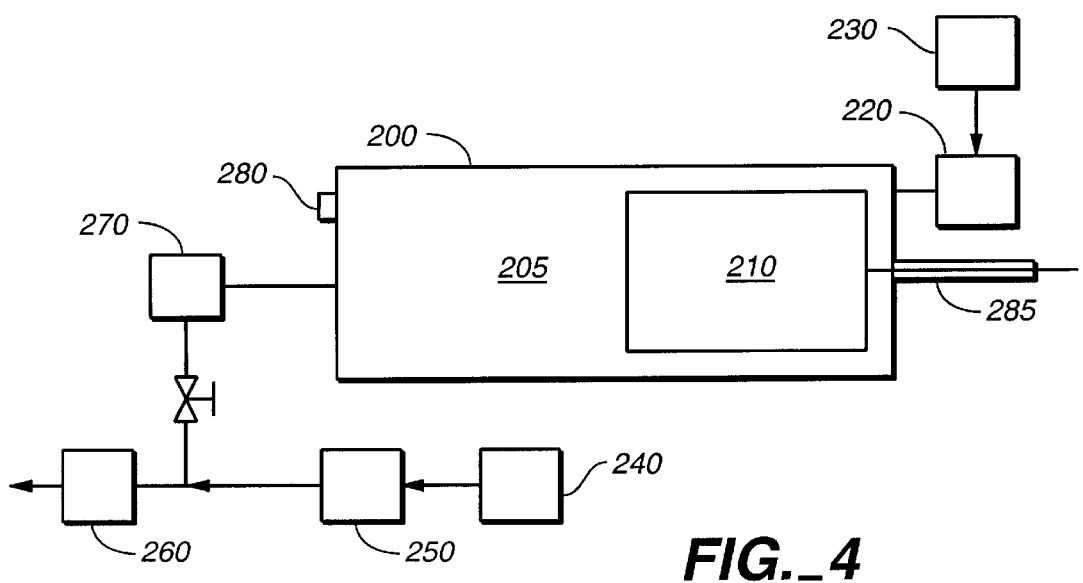
FIG._4

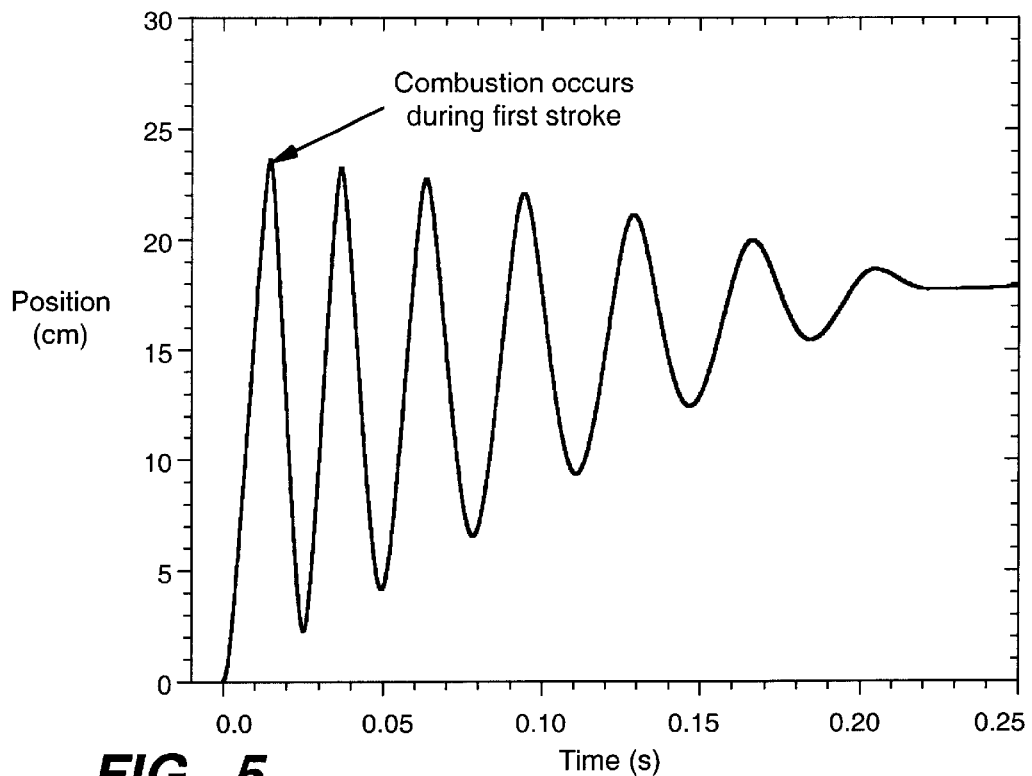
FIG._5
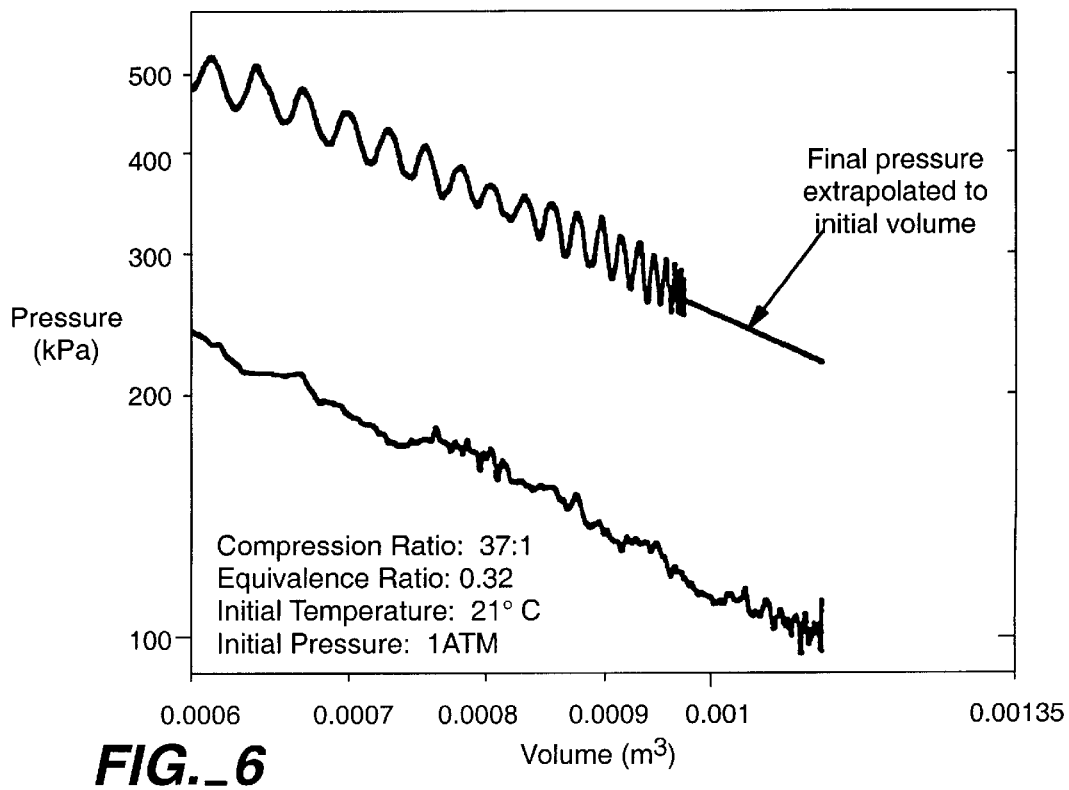
FIG._6

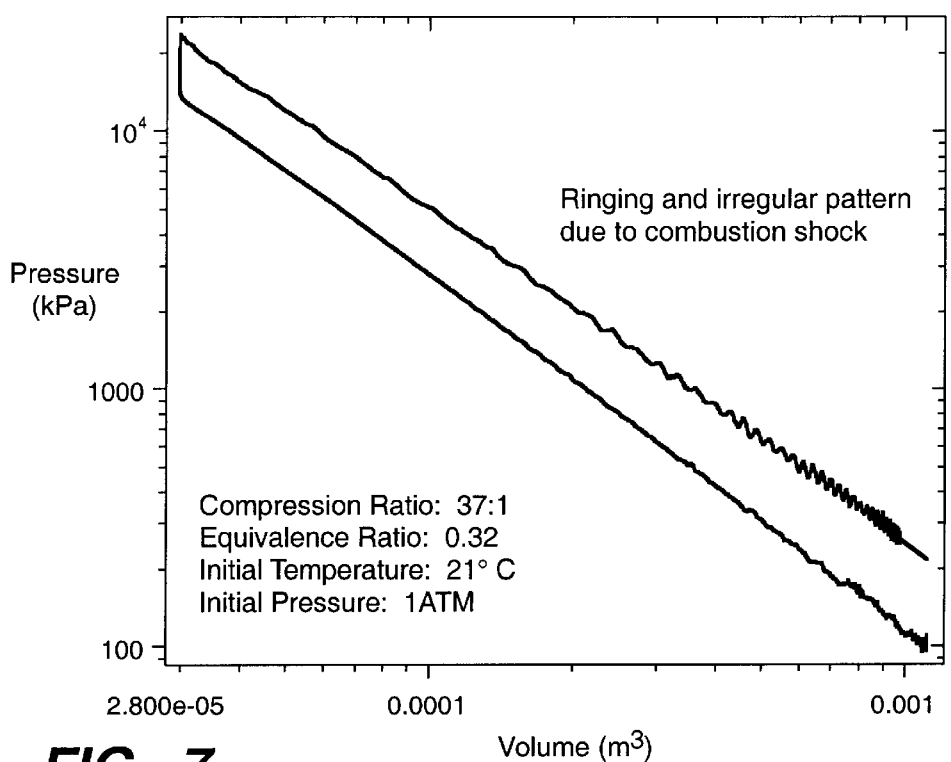
FIG._7
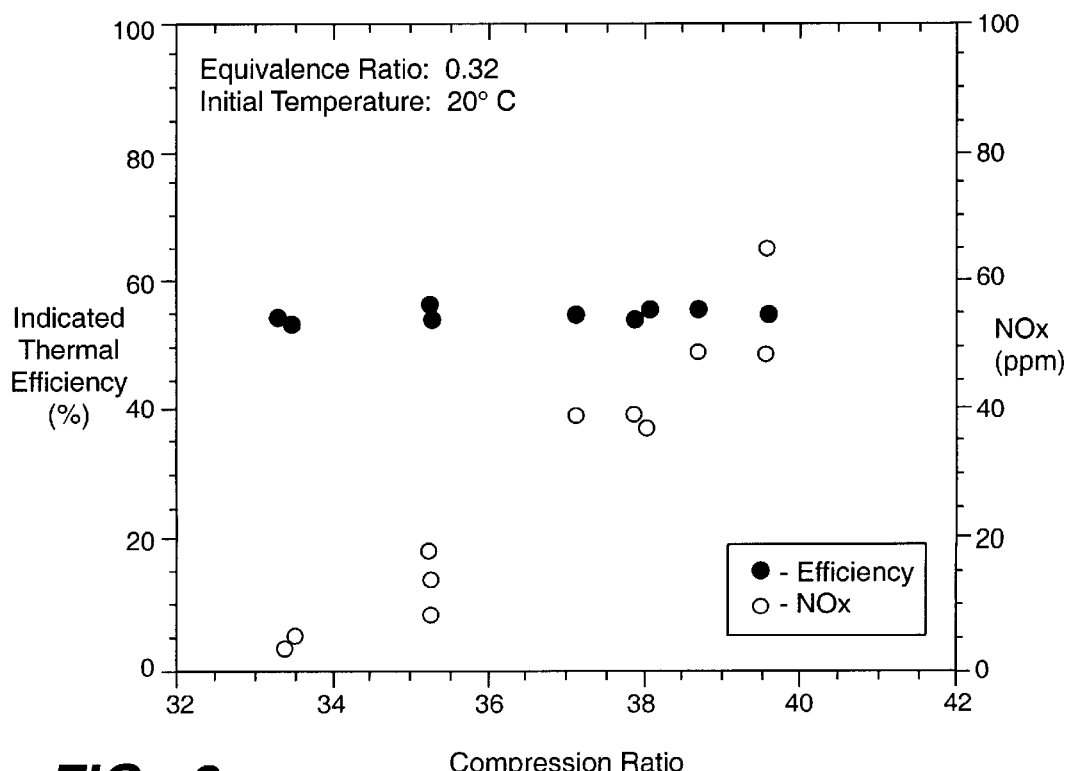
FIG._8

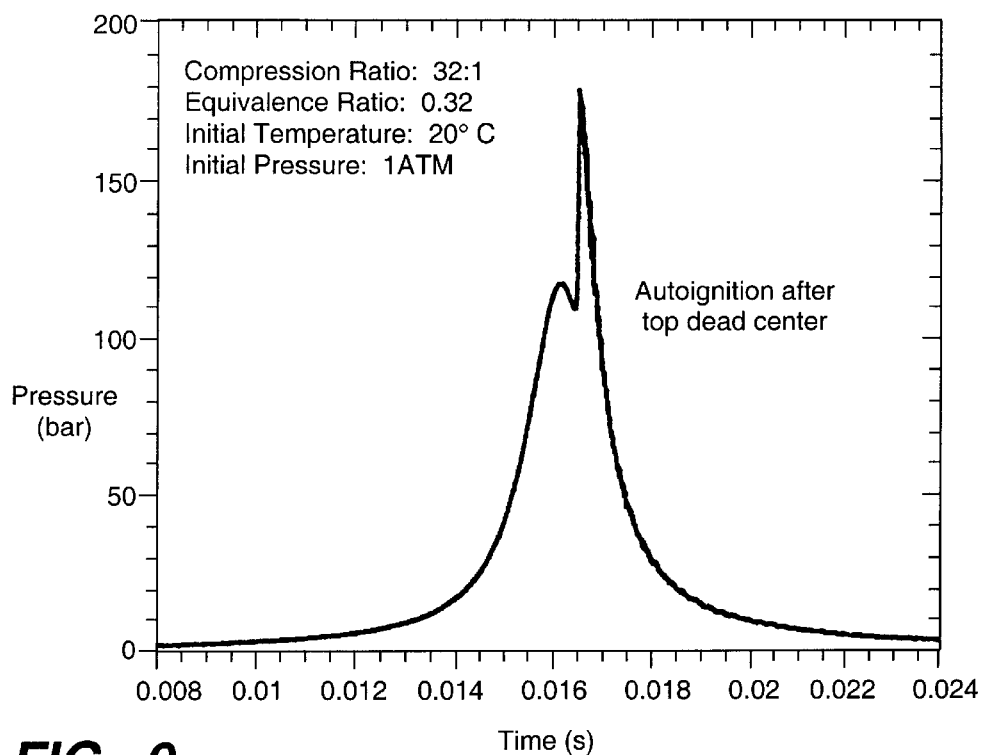
FIG._9
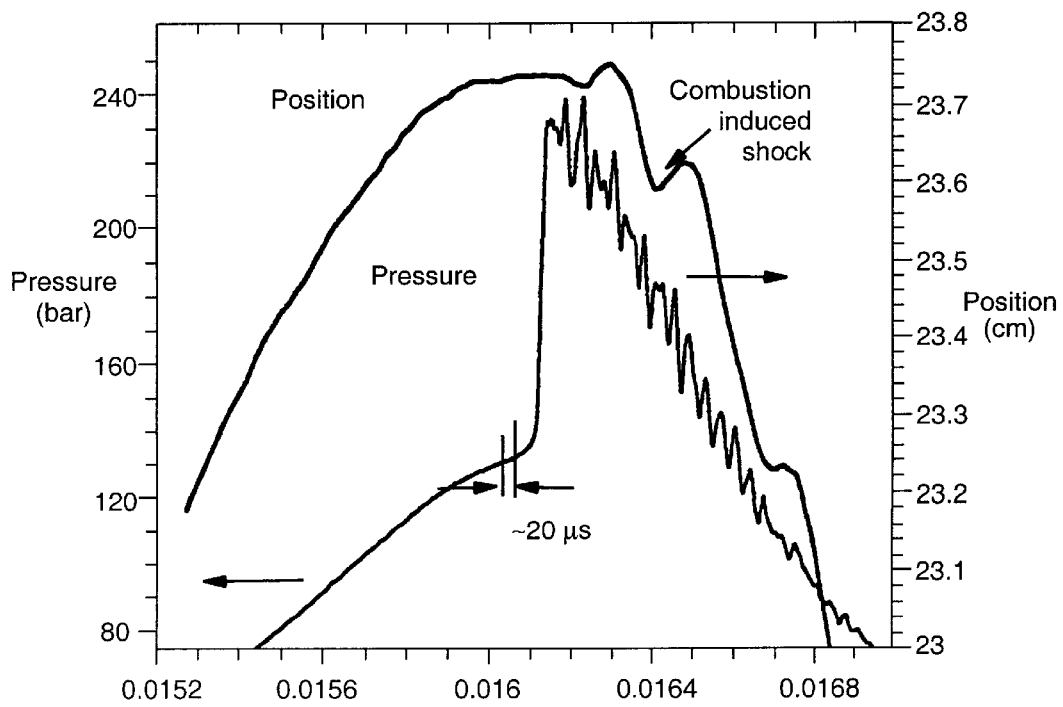
FIG._10

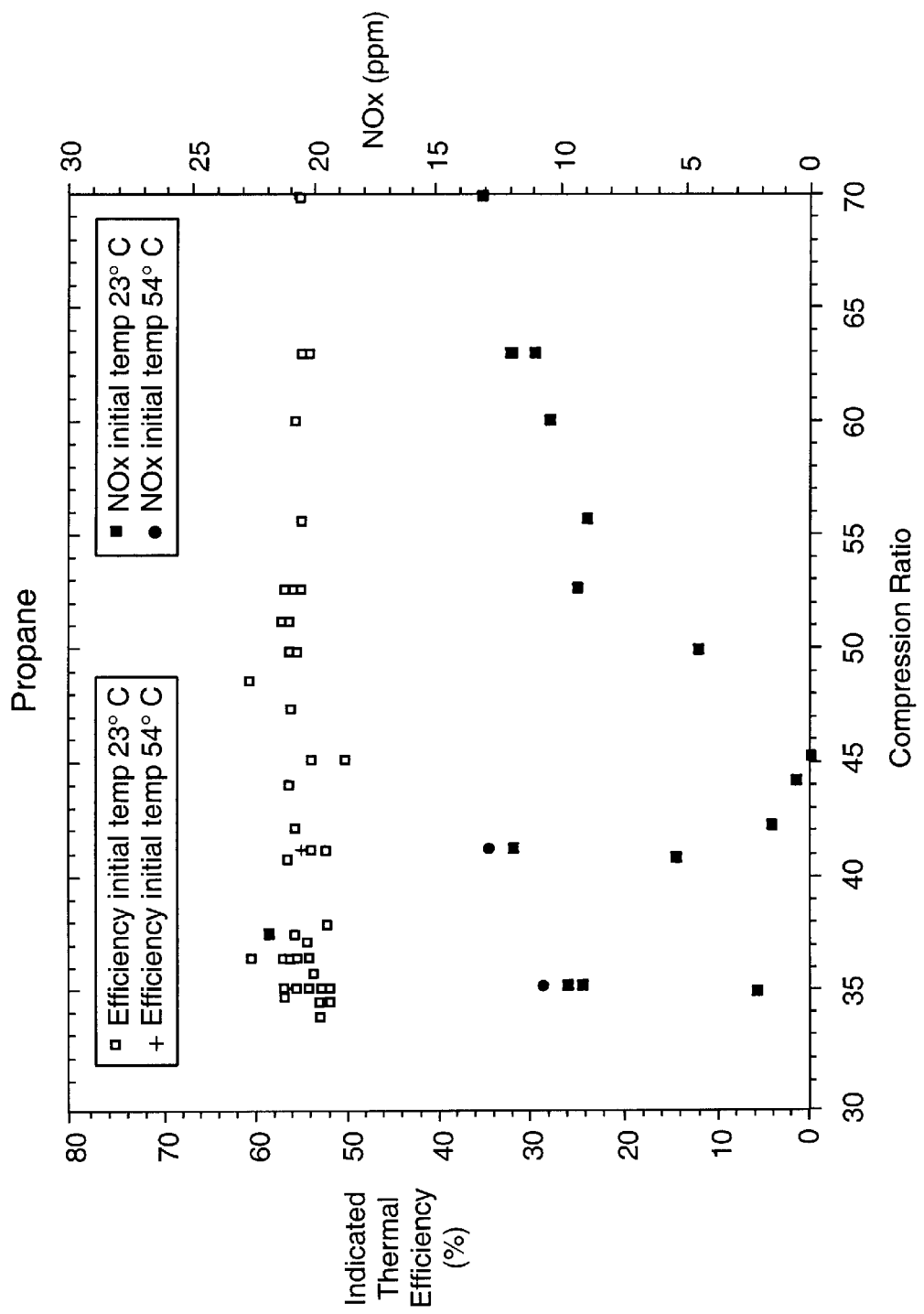
FIG._11

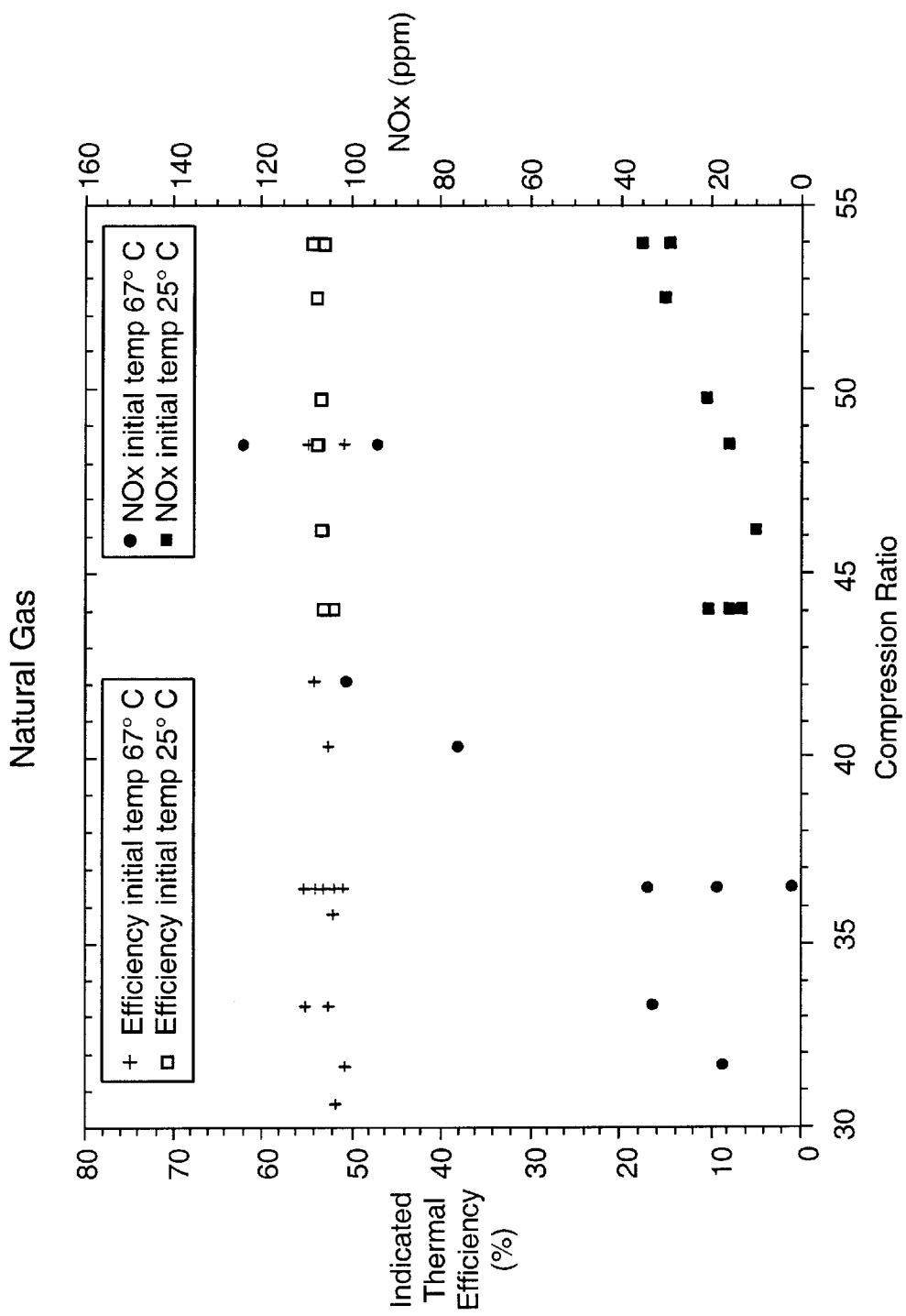
FIG._12

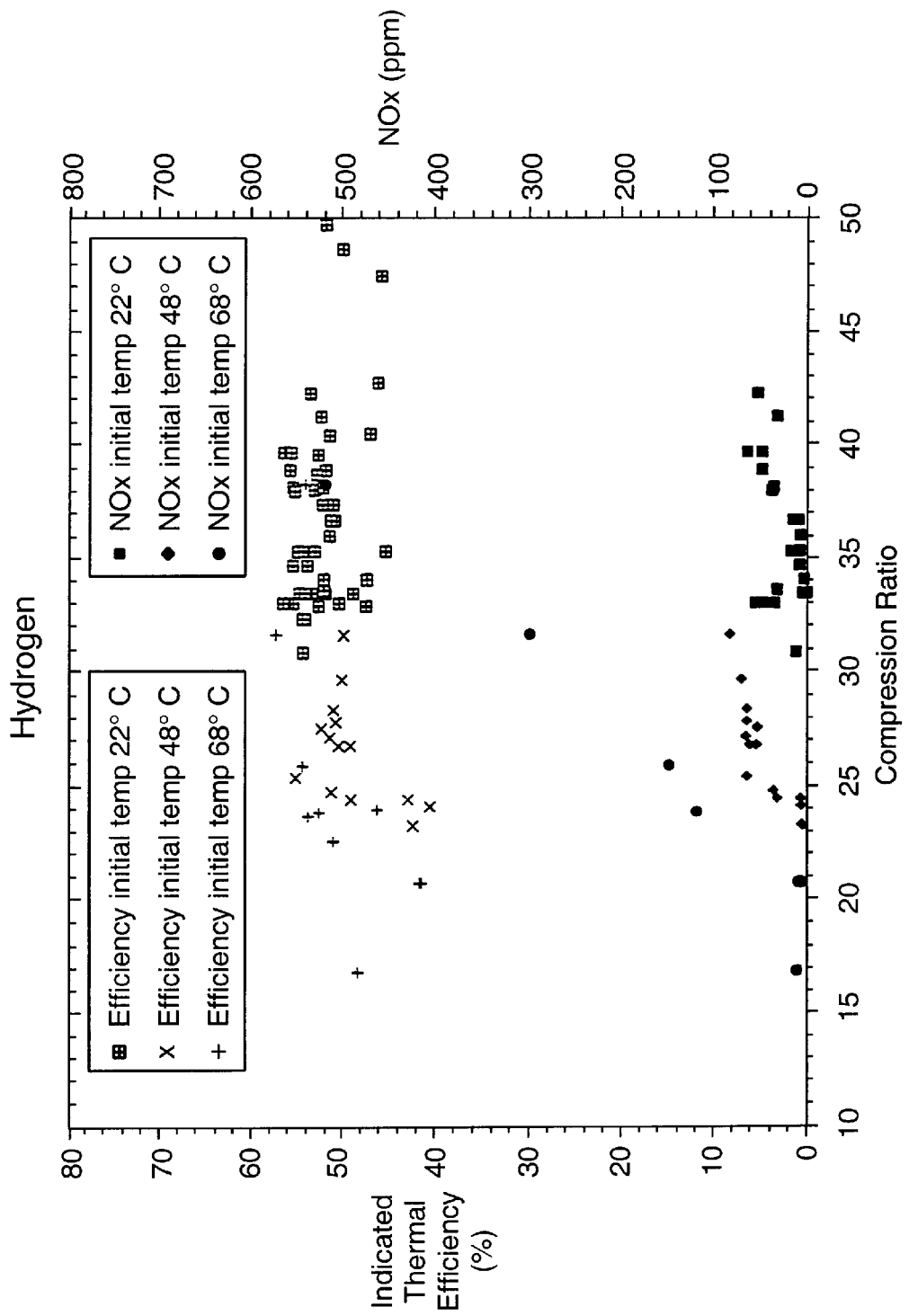
FIG._13

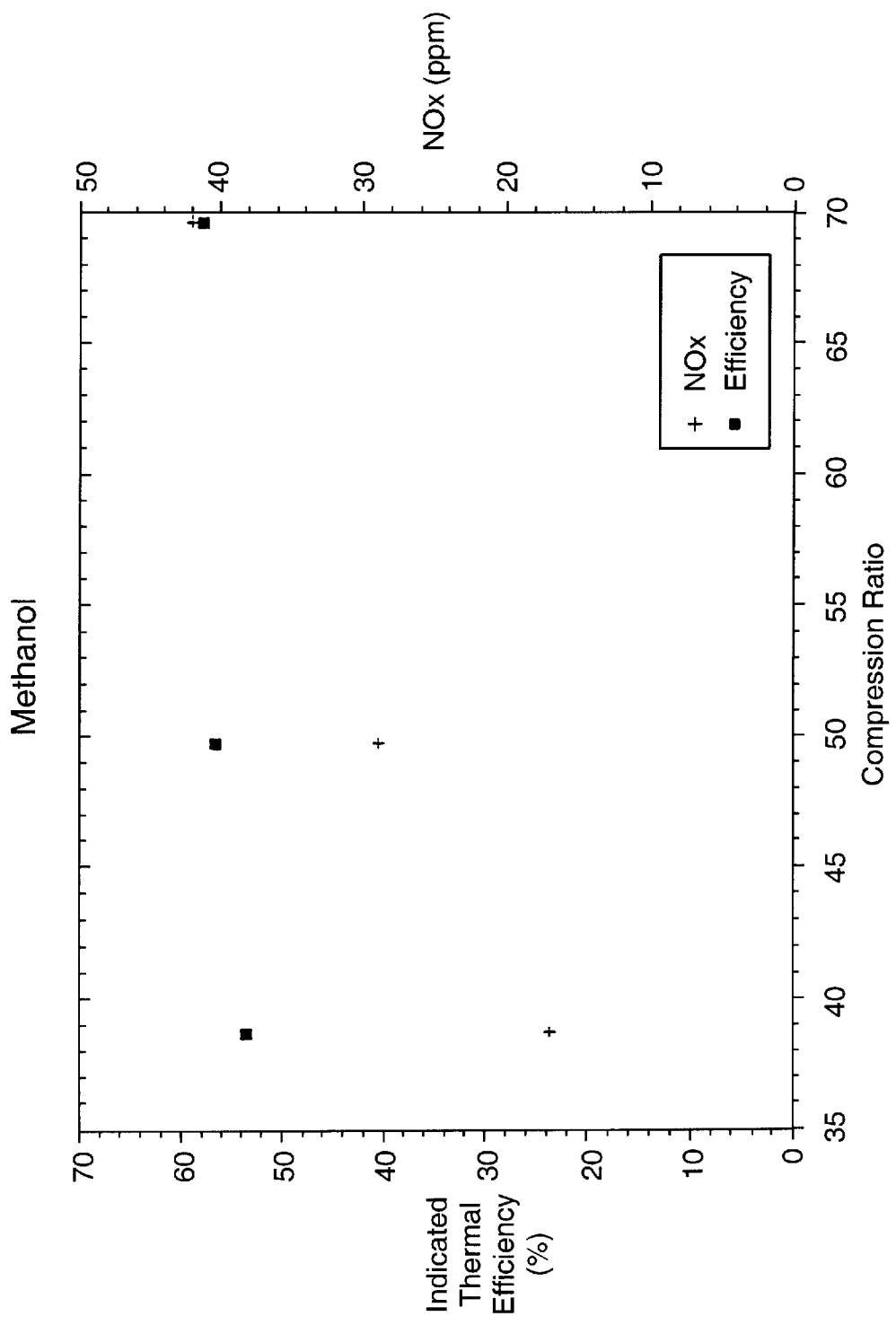
FIG. _14

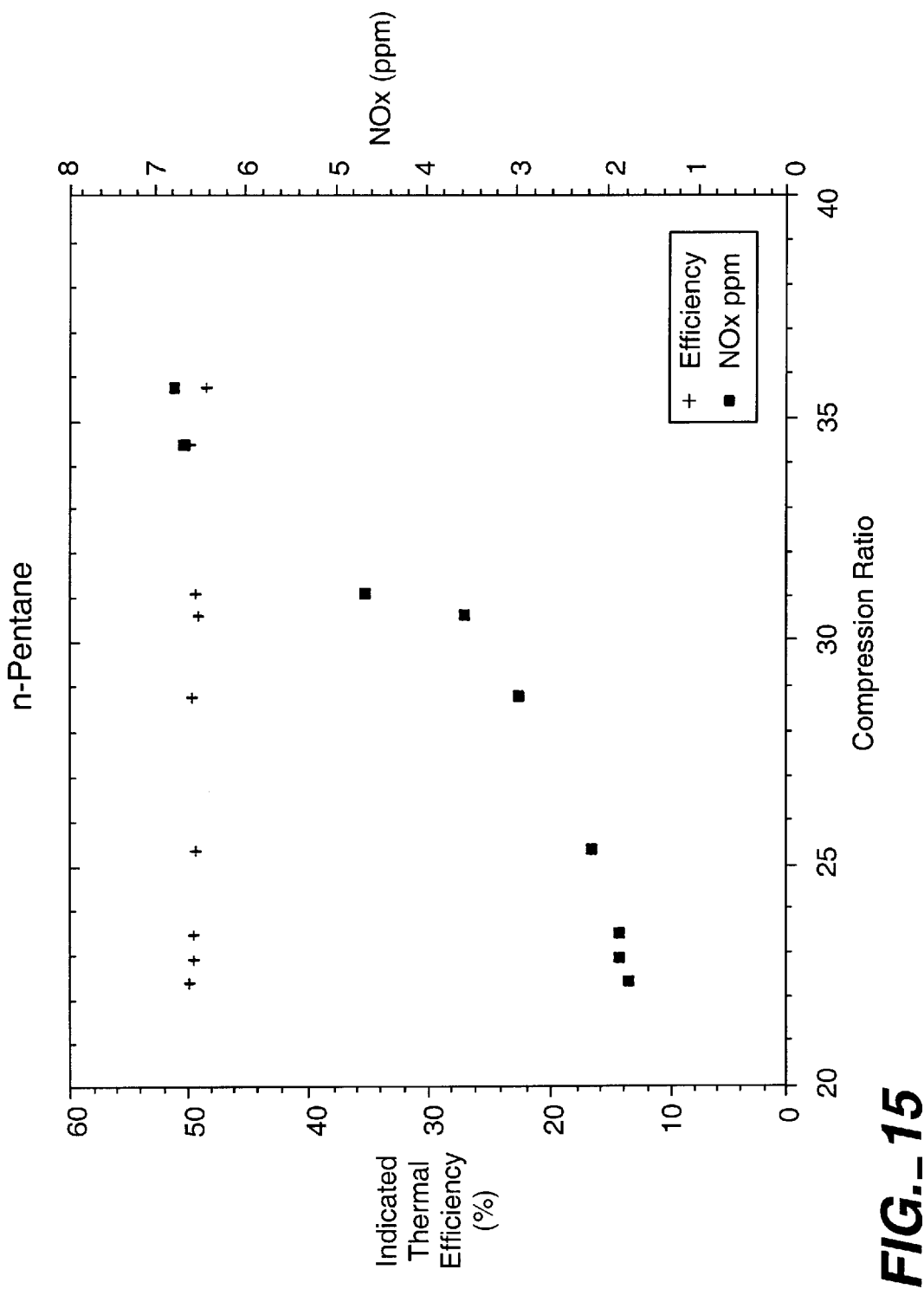
FIG._15

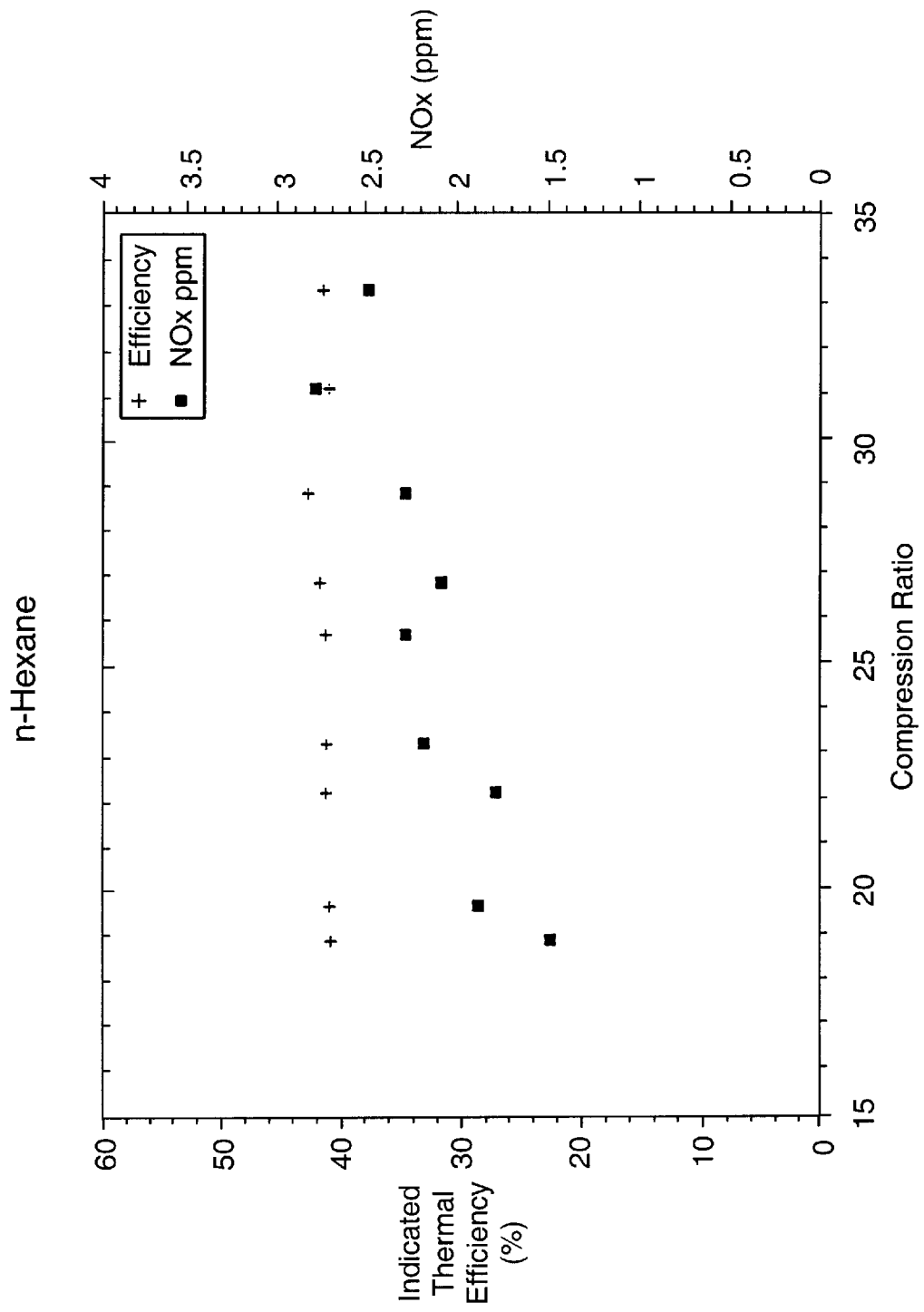
FIG._16

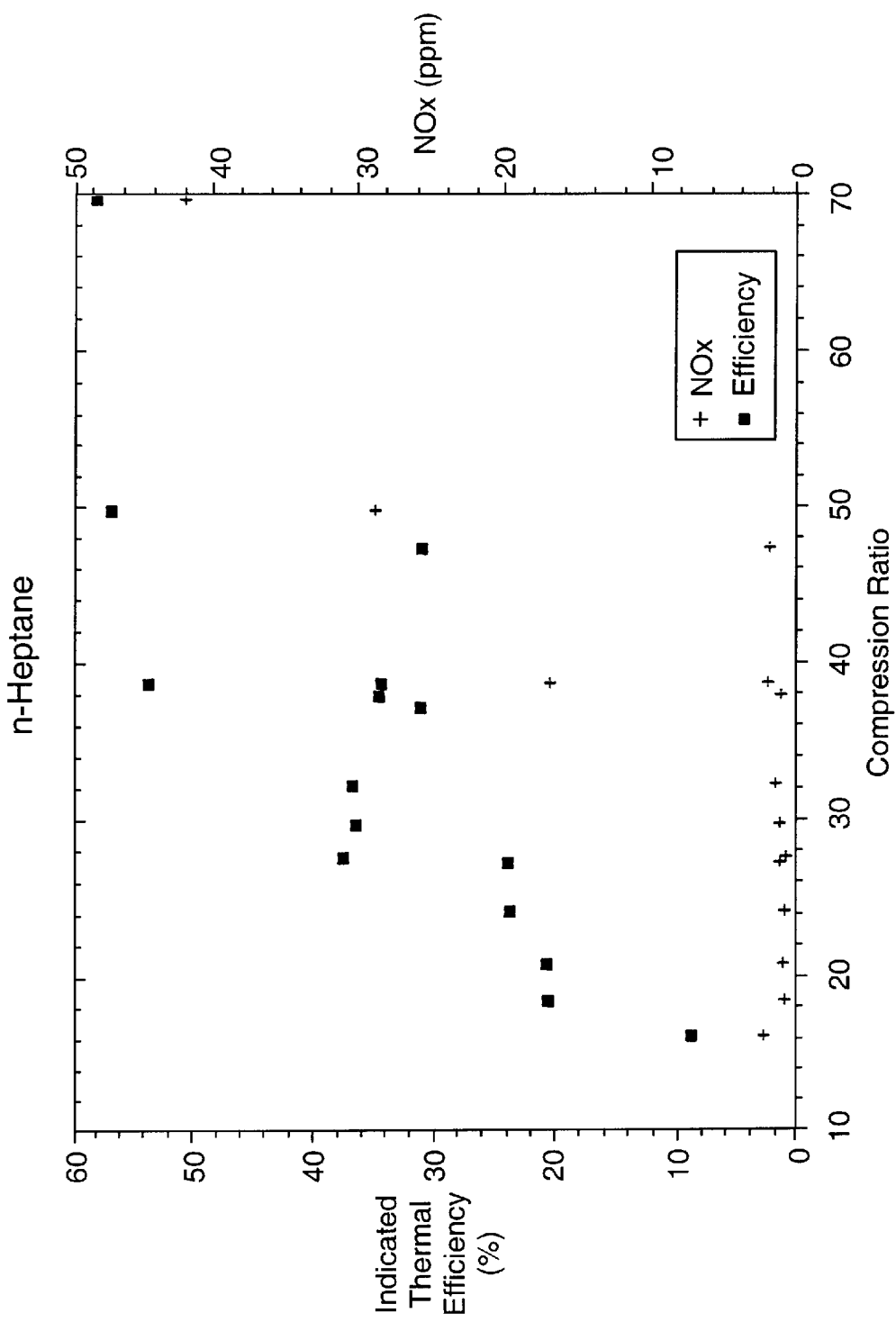
FIG._17

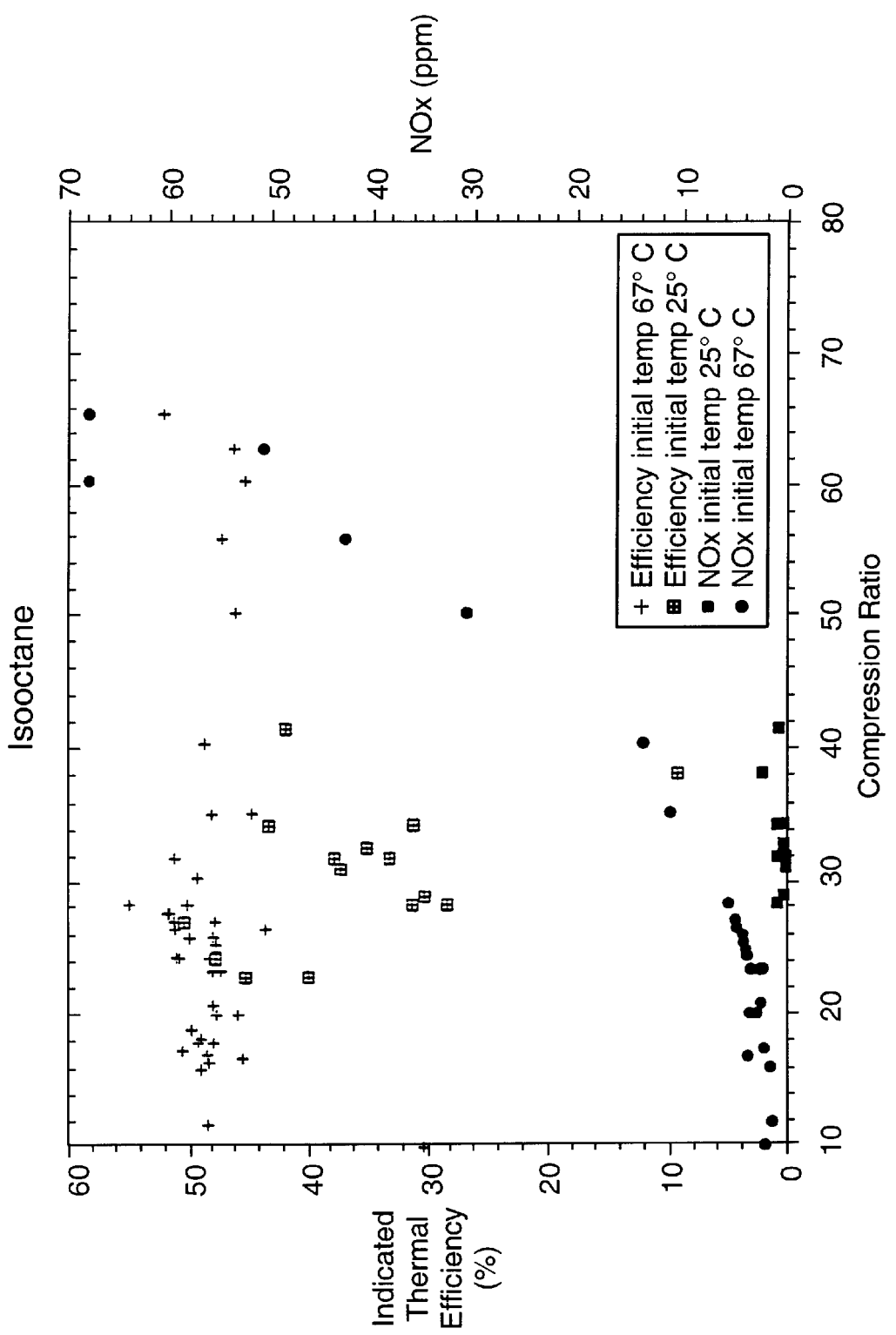
FIG._18

FREE-PISTON ENGINE

The U.S. Government has a paid-up license in this invention and the right in limited circumstances to require the patent owner to licence others on reasonable terms as provided for by the terms of Contract No. DE-AC04-94AL85000 awarded by the Department of Energy.

FIELD OF THE INVENTION

The present invention relates to autoignition internal combustion, free-piston, reciprocating engines, and particularly such engines cooperating or combined with linear generators for use in a hybrid automobile vehicle, boat, locomotive, or power plant. Engines of the present invention can achieve high thermal efficiency while generating extremely low levels of $NO_x$ emissions.

BACKGROUND OF THE INVENTION

Many methods have been devised to generate alternating current by converting mechanical energy into electrical energy via electromagnetic principles. The basic principle requires the relative motion of an electrical conductor, usually a conductive winding, with respect to a magnetic circuit to induce the flow of an electrical current in the conductive winding. Most devices employ rotational motion of an electrical conductor with respect to a multiple magnetic circuit as a means to induce an alternating electrical current.

Alternators that employ a translating or reciprocating member are generally referred to as linear alternators. Linear alternators are often used with free-piston stirling engines to extract electrical power from the reciprocating elements. In these prior art linear alternators, permanent magnets are utilized to develop a magnetic flux field which flows through the magnetic circuit. This flux field is traversed by an electrical conductor, usually in the form of an inductive coil. There are some general advantages to this approach. Linear alternators equipped with permanent magnets are physically smaller, require less volume, and tend to weigh less than alternative approaches.

Free-piston engines of various types are known and have certain essential features common to them all. The variations of free-piston engines include, for example, a pair of opposed pistons in a single cylinder as described in U.S. Pat. No. 3,234,395; a central piston rod having end-pistons at opposite ends with a cooperating free-piston axially spaced from each end-piston, thus forming two pairs of free-pistons as described in U.S. Pat. Nos. 3,541,362; 3,501,087; and 3,347,215; opposed sets of pistons with each set attached to a common rod, the inner pistons of the sets cooperating in a single cylinder and the remote outer pistons of the sets in separate cylinders, as described in U.S. Pat. No. 4,480,599; and one pair of pistons on a single rod with separate cylinders for each piston as described in U.S. Pat. No. 4,532,431. The general principles of operation of these and related free-piston engines are well known, with combustion at appropriate times, often by Diesel cycle, providing the power strokes of the pistons combined with appropriate inlet and outlet valves and/or ports.

With respect to conventional engines, Caris and Nelson investigated the effect of compression ratio on the efficiency of production General Motors Corporation V-8 engines modified for high compression ratio and found that brake thermal efficiency was maximized at a compression ratio of 17:1. See, *SAE Trans.* 1959, 67, 112–124. They suggested that the increasing departure from theoretical behavior as the compression ratio is increased is due to a longer burn duration at these higher compression ratios and/or the dissociation of the combustion products resulting in a pressure limit. Edson later studied the dissociation issue and concluded that this was a second-order effect at practical compression ratios. See, *SAE Progr. Technol.*, 1964, 7, 49–64. Thus it appears that Caris and Nelson effectively demonstrated that, in their engine geometry, burn duration is the major detriment to the efficiency increase expected with increasing compression ratio.

The spark ignition crankshaft engine is limited in compression ratio by autoignition of the end gases. Diesel engines can utilize high compression ratios but suffer from fuel injection rate limitations. Both types of engines are limited by the finite amount of time required for the fuel/air mixture to burn.

Another problem associated with conventional engines is the pollutants generated. Since the discovery of burning fuels for heat or energy, there has been a problem of emissions from such burning. These polluting emissions consist of unburned fuel as well as the by-products of combustion, such as carbon dioxide, soot, carbon monoxide, partially burned fuel, and oxides of nitrogen ($NO_x$).

Currently, most hydrocarbon fueled trucks and automobiles in the United States are required to have a catalytic converter on the exhaust gas line to decrease the amounts of polluting emissions.

Catalytic converters may have either oxidizing or reducing catalysts. The oxidizing catalysts continue the oxidation of the partially oxidized compounds in the exhaust gas. Thus, carbon monoxide is converted to carbon dioxide; unburned hydrocarbons are converted to carbon dioxide and water. Reducing catalysts effect the reduction of the nitrogen oxides to nitrogen and oxygen. Some three way catalysts are known whereby all three pollutants are reduced to varying degrees. The drawback of three way catalysts is that their efficiency is a function of the air/fuel ratio and peak efficiency is at a very narrow range of air/fuel ratios. Furthermore, none of the pollutants are entirely removed, and extremely expensive catalysts, such as rhodium, may be required. See, "Internal Combustion Engine Fundamentals", John B. Heywood, McGraw-Hill, New York, 1988, page 655–6, and "History of the Internal Combustion Engine" J. R. Mondt, published by ASME in ICE vol. 8, (1989).

Another method proposed for the control of emissions from hydrocarbon fueled engines is by the use of oxygen enriched intake air. With 25% and 28% oxygen in the oxygen enriched air, there is a significant reduction of carbon monoxide and of hydrocarbons in the exhaust gas. But the nitrogen oxide emissions are increased substantially. The reference below also reports that the presence of increased nitrogen oxides was expected "because the oxygen enriched air increased flame speed and combustion progressed rapidly to produce extremely hot gases". See, "The Potential Benefits of Intake Air Oxygen Enrichment in Spark Ignition Engine Powered Vehicle", (SAE 932803) Ng, et al., (1993).

U.S. Pat. No. 5,117,800 describes a method for operating a diesel or spark ignition engine, with oxygen enriched air of up to 40% oxygen, preferably 24 to 28% oxygen. The method is taught to be especially important when using fuels that are difficult to oxidize. As to pollutants, the patent further teaches that there is a reduction in smoke but that "the $NO_x$ concentrations do increase with increasing oxygen addition."

$NO_x$ emissions originate primarily from oxidation of the nitrogen gas contained in air. The hotter the burning zone or the longer the combustion time, the more $NO_x$ is formed. Little if any $NO_x$ comes from the fuel since there are essentially no nitrogen compounds in hydrocarbon fuels. A typical analysis of automobile gasoline shows less than 0.1% nitrogen.

These pollution problems are not only present in the exhaust from moving vehicle engines such as those in cars or trucks, but also are present in the exhaust from large stationary engines. All of these engines produce large amounts of nitrogen oxides as well as carbon monoxide and partially burned hydrocarbons. To date, no satisfactory method has been found to completely control the emissions of any one of these three types of pollutants. Nitrogen oxides are the most difficult to even partially control and frequently are increased by some methods used to control the other pollutants. Yet nitrogen oxides are very detrimental and produce a brown haze that is noticeable over many inland valleys and prairies, and when combined with water vapor, produce nitric acid an acid rain component.

SUMMARY OF THE INVENTION

The invention is directed to a new combustion system which can utilize high compression ratios, short burn durations, and homogeneous fuel/air mixtures in conjunction with low equivalence ratios. Specifically, the electrical generator of the present invention includes a linear alternator comprising a double-ended free piston that oscillates inside a closed cylinder at high compression rates. Fuel and air are introduced in a two-stroke cycle fashion on each end, where the cylinder charge is compressed to the point of autoignition. The piston is driven in an oscillating motion as combustion occurs successively on each end. This leads to rapid combustion at almost constant volume for any fuel/air equivalence ratio mixture at very high compression ratios. The engine is characterized by high thermal efficiency and low $NO_x$ emissions.

In a preferred embodiment, the linear alternator efficiently converts the kinetic energy of the piston into electrical energy by means of moving permanent magnets through fixed electrical stator windings. Since the compression of the fuel/air mixture is accomplished inertially, the electrical conversion process is done precisely leaving the piston with enough kinetic energy to autoignite the gas in the opposing cylinder on the next stroke. Electronic control of the compression ratio is achieved with extreme mechanical simplicity.

Accordingly, in one aspect, the invention is directed to a free-piston, two-stroke, autoignition internal combustion engine including:

a housing including a cylinder having first and second combustion chambers at opposite ends thereof, wherein each combustion chamber includes an inlet and outlet;

a double-ended piston that is displaceable between the first and second combustion chambers and configured to operate at a compression ratio of at least about 16:1;

a linear alternator means operable with the piston for converting kinetic energy of the piston into electrical energy; and a source of fuel and air connected to the inlets, wherein the engine is characterized by a thermal efficiency of at least about 48%, a combustion duration of less than about 80 $\mu$sec, and wherein the engine emits near zero $NO_x$ emissions of less than about 20 ppm.

In another aspect, the invention is directed to a method for generating electrical current that includes the steps of:

(a) providing a free-piston, two-stroke autoignition internal combustion engine that includes:

(i) a housing including a cylinder having first and second combustion chambers at opposite ends thereof, wherein each combustion chamber includes an inlet and outlet;

(ii) a double-ended piston that is displaceable between the first and second combustion chambers;

(iii) a linear alternator means operable with the piston for converting kinetic energy of the piston into electrical energy; and (iv) a source of fuel and air connected to the inlets; and b) operating the engine at a compression ratio of at least about 16:1 with a combustion duration of less than about 80 $\mu$sec and wherein the engine is characterized by achieving a thermal efficiency of at least 48% and emitting near zero $NO_x$ emissions of less than about 20 ppm.

In a further aspect, the invention is directed to a hybrid vehicle including a frame, wheels, electric motors for driving the wheels, a storage battery for receiving electric current and for energizing the motors, and control means for operating the vehicle and components thereof, the improvement comprising employing the inventive free-piston engine-alternator for charging the battery.

The free-piston engine develops compression and rebounds through inertial loading, therefore, the only high strength components are the piston crown and the top cylinder area. No massive rigid structure is required and there are no bearings or support structures to be damaged by high pressures or shocks. In addition, the engine components, aside from the alternator, can be constructed of light weight materials.

BRIEF DESCRIPTION OF THE DRAWINGS

FIG. 1A is a cross-sectional view of an electrical generator that includes a free-piston, two-stroke, autoignition internal combustion engine which is coupled to a linear alternator;

FIG. 1B is a partially enlarged view of the linear alternator of FIG. 1A;

FIG. 1C is a schematic diagram of the free-piston engine with control system;

FIG. 2A is a schematic of a reluctance generator device;

FIG. 2B is a schematic of a linear direct current generator device;

FIG. 2C is a schematic of a three-coil induction generator device;

FIG. 2D is a schematic of a two-coil induction generator device;

FIG. 2E is a schematic of the external circuitry for the two-coil induction generator device of FIG. 2D;

FIG. 3 is a schematic of a hybrid battery car;

FIG. 4 is a schematic of a free-piston single stroke combustion apparatus;

FIG. 5 is a graph of piston position versus time;

FIGS. 6 and 7 are graphs of log pressure versus log volume;

FIG. 8 is a graph of indicated thermal efficiency and $NO_x$ versus compression ratio;

FIG. 9 is a graph of pressure versus time;

FIG. 10 is a graph of pressure and piston position versus time at top dead center; and FIGS. 11–18 are graphs of indicated thermal efficiency and $NO_x$ vs. compression ratios for different fuels.

DESCRIPTION OF THE PREFERRED EMBODIMENTS

As illustrated in FIG. 1, the symmetrically configured electrical generator 100 includes housing 120 which defines a chamber into which a one-piece, double-ended free piston 130 having ends 135A and 135B is positioned. The cross section of the chamber is preferably circular. The free piston is illustrated to be positioned so as to occupy more of the right side of the chamber so that combustion chamber 160A is larger than combustion chamber 160B. The housing further includes fuel ports 110A and 110B and corresponding exhaust ports 115A and 115B. In this embodiment, the length of the double-ended free piston is selected to be long enough so that while inlet 110A and outlet 115A are opened inlet 110A and outlet 115B are covered by the end 130B.

Because rotary engines with crankshafts are so common, the nomenclature describing their operation will be employed herein even though the free-piston engines have no rotary crankshafts. For example, a free-piston is described as being at top dead position (TDP), or at lower dead position (LDP), or at 30 degrees of crank rotation before LDP, even in the absence of any rotary crank. More specifically in a free-piston engine, the two opposite extreme linear displacements are called LDP and TDP for lower dead position and top dead position respectively, and the intermediate piston linear displacements are treated as if they are fractions of the 180° rotary crank displacement between these dead positions.

The power removal section (linear alternator or generator) in the center comprises permanent magnets 151, 152 and 153 which are encased within the free piston and fixed electrical stator windings (or coils) 170 which are secured along the perimeter of stator case 180. The permanent magnets on the piston create a moving field of magnetic flux. When this moving field passes through the stationary armature winding a voltage is induced and current flows into the load. The linear alternator also includes flux return stator laminations 140 and flux return backiron 190.

The permanent magnet flux generation design is shown in cross section in FIG. 1B. The three magnets 151, 152 and 153, with north and south poles as shown, are preferably rare earth permanent ring magnets with radial magnetization, with each ring consisting of 8–45 degree cylindrical sectors. Each ring is overwound with soft magnetic steel wire to hold it in place. The direction of magnetization of the center magnet 152 is opposite to that of the end magnets. Suitable magnets include, for example, neodymium iron boron magnets with a minimum energy product of 35 MGO and a maximum working temperature of 150° C. The magnetic flux lines 156 traverse the moving (190) and fixed (195) sections of the linear alternator and passes through coils 170. Sections 190 and 195 are preferably made of steel. As the magnets move axially (along centerline), each of coils sees a varying flux pattern which generates a varying current. Thus power is generated in the coils. Each coil can be isolated from the other coils by a diode network, therefore all of the power is converted to DC.

Besides the permanent magnet generator, other linear generator arrangements for converting the kinetic energy of the piston into electrical energy can be employed. These include, for example, the reluctance generator, the linear direct current generator, and three-coil and two-coil induction generator devices. These alternative approaches are further described in "Free-Piston Engine Linear Generator for Hybrid Vehicles Modeling Study, Interim Report, TFLRF No.305 by Callahan and Ingram" prepared for Advanced Research Projects Agency, Contract No. DAAK70-92-C,0059 (1995), which is incorporated herein by reference.

FIG. 2A illustrates a reluctance generator device which comprises housing 40 that defines aperture 48 through which rod 42 can traverse. Rod 42 is connected to a piston (not shown). Both housing 40 and rod 42 comprise ferromagnetic material. The motion of the ferromagnetic materials in the rod changes the mutual inductance between the separate, stationary excitation, coil 46 and armature coil 44. The instantaneous voltage induced in the armature coil is equal to the product of the excitation coil current and the time rate of change of the mutual inductance between the coils.

FIG. 2B illustrates a linear DC generator device which comprises a stationary ferromagnetic yoke, including outer member 50 and inner member 52, that is used to guide flux and reduce excitation requirements while the stationary excitation coils 54 and 58 produce an air gap flux field. The armature coil 56 is mounted on the piston (not shown) and moves in the air gap field. The voltage induced in the armature is applied via sliding brush contacts (not shown) to the load.

FIG. 2C illustrates a three-coil induction generator device which comprises housing that is made of a ferromagnetic material and includes an inner member 60 and outer member 62. In essence, the monolithic conductive sleeve 64 which is attached to the piston (not shown) functions as a "shutter" that controls the amount of flux produced by the field winding or excitation 66 that cuts the armature winding 68. The time variation of this flux induces the required voltage in the armature. The (stationary) ferromagnetic materials in the system guide flux and reduce the excitation requirements.

FIG. 2D illustrates a two-coil induction generator device which comprises housing that is made of a ferromagnetic material and an inner member 70 and outer member 72. In this design, the conductive sleeve 74 which is attached to the piston (not shown) acts as a shutter, controlling the area of the flux path through the air gap. This action causes the effective stator terminal inductance to vary with piston position and allows the system to generate a voltage.

The one coil 76 accessible externally must provide both excitation and deliver generated power to the load. The external circuitry which is shown in FIG. 2E allows the coil to fill this dual role. The active current source produces the excitation current; the coil current never falls below this value. The diode keeps the battery from producing an opposing current flow when the generated voltage is less than the battery voltage. During those portions of the cycle when the generated voltage rises above the battery voltage, however, the diode allows current and power to flow into the battery.

The inventive free-piston two-stroke autoignition internal combustion engine will exhibit superior performance. Specifically, the new combustion system is capable of high compression and rapid combustion of lean homogeneous charges. The result will be high efficiency and low $NO_x$ emissions. As is apparent, the autoignition (also known as compression ignition) engine requires no spark plug mechanism. It is expected that the free-piston engine will operate at a compression ratio of at least 16:1 and preferably the compression ratio will range from about 20:1 to about 40:1, and more preferably from about 25:1 to about 35:1. By "compression ratio" is meant the cylinder volume at the time the inlet ports close divided by the cylinder volume at the time the piston stops at top dead center.

Further, the free-piston engine is expected to achieve a thermal efficiency of at least about 48%, and preferably the thermal efficiency will be greater than about 50%, and more preferably greater than about 52%. By "thermal efficiency" is meant the energy in the electricity produced divided by the lower heating value of the fuel consumed, this number being multiplied by 100.

Moreover, the free-piston engine is expected to exhibit a combustion duration of less than about 200 microseconds ($\mu$sec.), preferably less than about 80 $\mu$sec, and more preferably less than about 50 $\mu$sec. By "combustion duration" is meant the time for at least 95% of the fuel to be combusted.

The inventive free-piston engine can use conventional fuels suitable for internal combustion engines; moreover, combustion fuel/air mixture can be of any leanness. The fuels typically used can include, for example, hydrogen, hydrocarbons or mixtures thereof. The hydrocarbons include, for example, propane, gasoline, diesel fuel, jet fuel, kerosene, bunker fuel, natural gas, alcohol-hydrocarbon mixtures, and the like. Typically, the equivalence ratio for the fuel/air mixture will range from about 0.25 to about 0.55 and more preferably from about 0.30 to about 0.35. By "equivalence ratio" is meant the ratio of the actual fuel/air ratio to the stoichiometric ratio.

Finally, the free-piston engine is expected to emit extremely low levels of $NO_x$ emissions. As is apparent, the $NO_x$ emissions rate will depend on a number of different parameters including, for example, the equivalence ratio and the type of fuels used. Reducing the equivalence ratio will generally tend to reduce the amount of $NO_x$ emissions. Typically, the free-piston engine will emit near zero $NO_x$ emissions of less than about 20 ppm, preferably less than about 10 ppm and more preferably less than about 5 ppm.

When starting the free-piston engine as illustrated in the FIG. 1C, sensing device 425 detects the position of the free-piston 430 that is positioned inside the combustion chambers of the engine. The sensing device, for instance, can detect magnet 426 that is positioned at a strategic location along free-piston 430 which separates the interior of housing 420 into two combustion chambers 435A and 435B. Once the position of the free-piston is determined, appropriate signals from computer 410 initiate the oscillation process. As is apparent, sensing device 425 can be employed to determine the velocity of the free-piston.

The system shown in FIG. 1C further includes fuel source 440 and air source 445 which are connected to inlet ports. The flow rates of the fuel and air are controlled by controller regulated valves 480A and 480B, respectively. Fuel analyzer 442 measures the composition of the fuel mixture prior to entering the combustion chamber. As described in detail above, the linear alternator includes stationary coils 492 and magnets 490, which are attached to the free-piston. During the electricity generating mode, current from the coils through wire 453 charges battery 450. In the start-up mode, current from the battery will create magnetic fields within the coils 492 which cause magnet 490 and the free-piston to which it is attached to move to the proper position in the interior of the engine before initiating injection of the fuel/air mixture into one of the combustion chambers.

To start the engine the linear alternator is operated as a linear motor. By utilizing the included piston position sensor the electrical coils can be energized using battery power in a fashion to push the piston in a desired direction. By continuing to monitor piston position and energize the appropriate coils the piston can be resonantly oscillated in the cylinder, building to higher compression each cycle until sufficient compression is developed for autoignition, at which time fuel is introduced to the engine and self powered operation will ensue.

Connected to coils 492 is current control unit 496 having conventional circuitry which regulates the current that flows through coils 492. By increasing or decreasing this current, the system can regulate the velocity of the piston. Thus in response to changes in the fuel composition, equivalence ratio of the fuel/air mixture, or other variable, the velocity of the piston can be modified which can result in a change in the compression ratio, for instance. During continuous operation of the engine, the computer opens and closes the inlets and outlets synchronously to produce the desired pressure volume relationships in each of the combustion chambers.

The inlet and exhaust processes both occur through cylinder wall ports when the piston is near the bottom of its stroke in typical 2-stroke fashion. When the piston moves up (toward the cylinder end) the ports are closed off by the piston and the cylinder becomes a gas spring for the piston. Thus each end of the engine contains a gas spring and the piston becomes a resonating part in a spring-mass system. In a system with no losses, e.g., friction or gas flow, the piston, when initially displaced from center and released, will oscillate back and forth at a speed which is a function of the initial displacement. If the gas springs were linear, the speed of oscillation would be fixed regardless of the piston displacement.

General techniques employed in conventional internal combustion engines can be adopted to operate the inventive free-piston engine. Internal combustion engines are described, for example, in "The Internal-Combustion Engine in Theory and Practice", Vol. 1, $2^{nd}$ Ed., C. F. Taylor, MIT Press, 1966, "The Internal-Combustion Engine in Theory and Practice", Vol. 2, C. F. Taylor, MIT Press, 1985, and "Internal Combustion Engine Fundamentals", J. B. Heywood, McGraw-Hill Inc., 1988, which are incorporated by reference.

FIG. 3 shows schematically a hybrid system or vehicle comprising frame 310, wheels 320, the inventive free-piston engine 330, battery set 340, conventional electric motor 350 that is coupled to a wheel, and an electrical control system represented by 360. The free-piston engine is well-adaptable for land and water vehicles, as cars, trucks, locomotives and boats and for on site power plants. Hybrid cars are a particulary good candidate for this invention, using electric storage batteries charged by the linear alternators and direct current motors coupled to the wheels. The potential advantages of hybrid automotive systems include the ability to operate the combustion engine at maximum efficiency independent of the wheels, load and/or velocity of the vehicle. Furthermore, the direct-current motors coupled to the wheels function as generator when the car is braked, which contributes to the enhanced efficiency. As is apparent, unlike the conventional automotive engines, with the inventive free-piston engine, throttle response is not important; the engine will shut off when not needed and run at essentially constant speed and power when on.

Experiments described herein have demonstrated the high efficiency and low emissions potential of the inventive combustion system. In addition, the linear alternator is shown to be efficient, and capable of starting and controlling the engine. Finally, the two-stroke cycle process is shown to support the high efficiency and low emissions of the combustion system.

A schematic of the free piston combustion device used in these experiments is illustrated in FIG. 4. The device includes housing 200 that defines an interior chamber 205 into which free-piston 210 is positioned. The interior chamber functions as a combustion cylinder having a combustion end and a driver end. As shown, the free-piston is positioned on the driver end and a source of high pressure helium 230 is connected to the driver end via a remotely operated fast acting valve 220. A source of a fuel/air mixture 240 is connected to the combustion end of chamber 205 through valves 250 and 270. Exhaust is removed from chamber 205 through valves 270 and 260. The exhaust can be analyzed with standard emission measurement devices (not shown). Pressure in the chamber is measured with pressure transducer 280. The following table lists the relevant specifications for the device tested.

| | |
|---|---|
| cylinder length (mm) | 355.6 |
| cylinder bore (mm) | 76.2 |
| cylinder outside diameter (mm) | 152.4 |
| stroke (mm) | 254 max, 236 typical |
| displacement (L) | 1.076 typical |
| piston and cylinder head | 304 stainless steel |
| cylinder | 6061 aluminum, hard anodized |
| maximum piston speed (cm/s) | 1100 typical |
| natural oscillation frequency (Hz) | 40 typical |

The device used high-pressure helium to drive a piston from one end of a closed cylinder to the other. This driving motion compresses a fuel/air charge on the other side of the piston to the point of autoignition. The piston returns to the back end of the cylinder as the combusted gases expand, compressing the helium charge. The piston bounces back and forth several times before stopping. The oscillating piston motion is shown in FIG. 3.

The indicated thermal efficiency is used as the metric by which different experimental points are compared. The indicated thermal efficiency is defined as the ratio of the net work on the piston to the fuel's lower heating value. The advantage of using the indicated efficiency as a gauge is that the mechanical losses from the engine can be excluded, and various operating points can be compared relative to changes in combustion parameters. This efficiency is calculated by measuring both the pressure in the combustion chamber and the displacement of the piston. The net work is integrated over the compression and expansion strokes. However, since the piston dies not fully return to the starting position on the expansion stroke (due to the trapped helium driver gas), as shown in FIG. 4, in order to calculate the full potential for this cycle, the piston position has to be extrapolated to the initial position. The method utilized for this extrapolation is to match the expansion line slope on a log pressure/log volume plot which is illustrated in FIG. 5. The data presented in this plot and throughout, is smoothed using a binomial method to remove noise. This smoothing, however, did not affect the efficiency calculations, which are accurate to within ±1.5%.

Pressure Measurement. The static magnitude of all low pressure gases was measured using two 10,000 torr absolute pressure range MKS BARATRONS, Type 390 HA heads with Type 270B display units achieving an accuracy of 0.05% of reading. High-pressure gases (i.e., helium) were measured using TELEDYNE-TABER strain gauge transducers with an accuracy of 0.25% of full scale.

Dynamic pressures were measured using piezoelectric effect transducers. Pressure on the driver end was quantified with a KISTLER Type 607 transducer coupled to a KISTLER Type 5004 charge amplifier. The combustion end utilized two transducers. KISTLER Type 7061A, 7063A, and 7061B as well as AVL Type QC42D-X transducers have been employed along with KISTLER Type 5010 and 5026 charge amplifiers. The best results, as determined by agreement of the initial and expansion pressures with absolute transducers, were obtained from the AVL unit. For this experiment, coating of the transducer faces with Silastic J (0.5 mm thick) also improved the precision. All of the presented data was recorded with the coated AVL unit. Pressure data was recorded on three NICOLET 4094 digital oscilloscopes through 12-bit Type 4570 plug-ins, at a rate of 500,000 samples per second.

Displacement Measurement. The piston displacement was measured with a DATA INSTRUMENTS FASTAR Model FS5000HP inductive transducer. Data were recorded on a fourth NICOLET 4094 digital oscilloscope at a rate of 200,00 samples per second.

$NO_x$ Measurement. A ROSEMONT Analytical Model 951A $NO_x$ analyzer was employed for post-test analysis of the combustion gases. Due to the generation of only one cylinder's worth of combustion products the instrument was modified for utilization of a smaller than usual sample. Here the bypass flow was eliminated, and the burned gases were pumped directly through the analyzer.

The $NO_x$ analyzer was calibrated by loading a 6.7±0.01 ppm span gas into the evacuated combustion chamber in its starting position and then pumping it through the analyzer. Thus, a quantity of gas equivalent to the post-test combustion gases was utilized. Comparison with standard calibrating techniques verified this process.

Fuel Mixing. Both liquid and gaseous fuels were tested. To mix the correct amount of fuel and air the chemical equation for each fuel was balanced at the desired equivalence ratio for each fuel. To maintain the $NO_x$ emissions near zero, the fuel energy was adjusted for each test by selection of the appropriate equivalence ratio (range from 0.3 to 0.5). For gaseous fuels the partial and total pressures of the fuel and air were determined. The fuel storage bottle (ten liter volume) was then evacuated to a pressure of 0.1 torr or less. The fuel was then slowly introduced into the fuel storage bottle and the pressure allowed to rise until the calculated pressure was reached. the fuel storage bottle was then valved off and the fuel allowed to come to a stable temperature and pressure. If the pressure stabilized at a value not equal to the desired value the total pressure was recalculated for this new partial pressure. In this way the correct equivalence ratio could be maintained. After fuel loading dry air was introduced into the fuel storage bottle until the pressure reached the calculated total pressure. The system was allowed to stabilize and the temperature and pressure for the mix were used with the partial pressure and temperature of the fuel to calculate the equivalence ratio.

For liquid fuels two methods were evaluated to mix the fuel and air. The first method used was to evacuate the combustion cylinder and then inject the correct amount (by weight) of fuel directly into the cylinder. The fuel was first drawn into a stainless steel syringe, and the syringe and fuel were weighted on a METTLER AE-164 scale. The fuel was then injected directly into the cylinder, the injector quickly removed and the cylinder quickly capped off. The fuel syringe was then weighed again to determine how much fuel was injected into the cylinder. The equivalence ratio was then calculated for this weight of fuel and air at atmospheric pressure.

The second method of preparing a liquid fuel mix was to evacuate the fuel storage bottle to a pressure of 0.1 torr or less. The fuel was loaded into a small container with a valve and the valve then closed. This small fuel bottle was connected to the fuel storage bottle and the area between the containers evacuated. The valve between the small fuel container and the fuel storage bottle was then opened causing the fuel to evaporate into the fuel storage bottle. When the pressure and temperature stabilized in the fuel storage bottle the fuel storage bottle was valved off and the small fuel container removed. The total pressure corresponding to this partial fuel pressure was calculated for the desired equivalence ratio and air added to the fuel storage bottle until the desired total pressure was reached. The system was allowed to stabilize, and the pressure and temperature recorded. The equivalence ratio was calculated from these final values and the partial pressure and temperature of the fuel. Care was taken to assure that all of the fuel would be gaseous by control of the equivalence ratio and temperature. Mass spectrometer analysis verified the precision of the mixtures using these methods.

Experimental Procedure. The single-cycle combustion experiment was performed in a high-pressure test cell, and transfer of the gases from the 10 liter fuel tank to the experiment cylinder was done remotely, as was the firing of the device. All of the tests were conducted at the same compression/expansion rate of 40 Hz oscillation.

Fuels Tested. Eight different fuels were tested, namely: hydrogen, propane, n-isooctane, n-pentane, n-heptane, methanol, natural gas, and n-hexane. The natural gas was a blend comprising 93.12% methane, 3.2% ethane, 0.7% propane, 0.4% butane, 1.2% carbon dioxide and 1.27% nitrogen.

To fuel the device, the piston was moved to the starting position utilizing vacuum and atmospheric pressures. The entire assembly was then evacuated to less than 200 m torr, and the premixed gas was sent into the cylinder's combustion end to the desired pressure. For ignition initiation, the helium driver gas was then pumped up to the firing pressure (based on the desired compression ratio; typically 362,00–490,000 torr). To function, a specially modified NUPRO bellows valve was actuated with an AUTOCLAVE ENGINEERS air operator (using helium) to open the tube connecting the helium supply to the driver end of the piston. This high pressure helium then drives the piston toward the cylinder head compressing the fuel air mix to the point of ignition. Data acquisition was triggered by the rising pressure in the driver end.

Combustion Gas Analysis. Following the stroking and eventual stopping of the piston, the combustion products were quantified by pressure-volume-temperature (PVT) analysis. In order to quantify leakage of gases from the cylinder during the test sequence, a post-test quantification was conducted. The combustion products were expanded into a larger measurement tank to a pressure of approximately 80 torr, ensuring that all the water was vaporized.

For $NO_x$ analysis, the gases were pumped to 1000 torr utilizing a DANIELSON TRIBODYN TD-100/38 oilless pump. Pump output was then sent to the $NO_x$ analyzer at a constant flow rate using an OMEGA ENGINEERING Inc. Model FMA 7305 mass flow controller. In this way approximately 90% of the gases could be utilized.

Experimental Results. FIG. 7 shows a log pressure versus log volume plot of a typical experiment using hydrogen, demonstrating the similarity in shape to the ideal constant-volume cycle. As is apparent, with a hydrogen fuel/air mixture at an equivalence ratio of 0.32, and initial temperature of at 20° C., the indicated thermal efficiency is 56% with essentially zero $NO_x$ emissions. This compares with the 45% thermal efficiency of conventionally configured and optimized engines. Data (log pressure vs. log volume diagram) for the remaining fuels tested also demonstrated a similarity in the shape to the ideal constant-volume combustion cycle as in the case for hydrogen.

FIG. 8 gives the indicated thermal efficiency and $NO_x$ levels as a function of compression ratio for above the hydrogen fuel/air mixture. Under these conditions, autoignition occurs at a compression ratio of about 32:1, where the pressure versus time trace shown in FIG. 9 reveals a late ignition point. After this point, efficiency is only a weak function of increasing compression ratio, an indication that heat less near top dead center is not a critical performance factor. This characteristic of the combustion system is also attractive for engine control, since a limited variation of compression ratio is not detrimental.

With the inventive free-piston engine, rapid reaction rates are achieved, and the compression ratio is to be adjusted to the operating conditions. In addition it is possible to generate constant-volume combustion regardless of the violence of combustion, and at high compression ratios. FIG. 10 is a typical graph of pressure and piston position versus time at the top dead center for the experimental device illustrated in FIG. 2. As is apparent, the achievable reaction rate is so rapid that considerable ringing is generated in the pressure and displacement records. This accounts for the sawtooth pattern and other irregularities in FIG. 7, which is the graph of log pressure versus log volume.

For the propane fueled experiment, which was performed at an equivalence ratio (E/R) of 0.400, FIG. 11 gives the indicated thermal efficiency and $NO_x$ levels as a function of compression ratio for this mixture. Under these conditions, autoignition first occurs at a compression ratio of about 34:1. For the natural gas fueled experiment which was performed at an equivalence ratio of 0.357, FIG. 12 gives the indicated thermal efficiency and $NO_x$ levels as a function of compression ratio for this mixture. For natural gas, note that for an initial temperature (IT) of 25° C. combustion does not occur until a compression ratio of 44:1 is reached. FIGS. 13, 14, 15, 16, 17 and 18 show similar data for hydrogen (E/R 0.319), methanol (E/R 0.330, IT 25° C.), pentane (E/R 0.335, IT 25° C.), n-hexane (E/R 0.503, IT 25° C.), n-heptane (E/R 0.334, IT 25° C.), and isooctane (E/R 0.321, IT 25° C.), respectively.

The results for n-hexane in FIG. 16 indicate that the initial reaction compression ratio is only 19:1 at an initial temperature of 25° C. However, studies also suggest some reaction prior to the main combustion event, and this prior reaction occurs at a compression ratio of about 16:1. Similar studies for n-heptane indicate that the fuel undergoes three reaction points. With an initial temperature of 25° C., isooctane was found to react quickly with no early reaction, but the fuel did not seem to react completely. At higher initial temperatures this fuel reacted more completely.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A free-piston, two-stroke, autoignition internal combustion engine that emits near zero $NO_x$ emissions of less than about 20 ppm comprising:

a housing including a cylinder having first and second combustion chambers at opposite ends thereof, wherein each combustion chamber includes an inlet and outlet;

a double-ended piston that is displaceable between the first and second combustion chambers;

a linear alternator means operable with the piston for converting kinetic energy of the piston into electrical energy;

a source of fuel and air that supplies a fuel and air mixture into each combustion chamber through the inlets;

means for controlling the compression ratio to cause autoignition of the fuel and air mixture in each combustion chamber at a compression ratio of at least about 16:1; and means for causing the fuel and air mixture to react following autoignition at a combustion rate so that at least 95% of the fuel is combusted in less than about 80 μsec wherein the engine is characterized by a thermal efficiency of at least about 48%.

2. The free-piston engine of claim 1 wherein the source of the fuel and air supplies a fuel and air mixture that has an equivalence ratio that ranges from 0.25 to 0.55.

3. The free-piston engine of claim 1 wherein the means for controlling the compression ratio causes autoignition of the fuel and air mixture in each combustion chamber at a compression ratio of about 25:1 to 35:1.

4. The free-piston engine of claim 1 wherein the linear alternator means comprises an electrical stator and a permanent magnet, with one of said stator or magnet being secured to the free-piston and the another being secured to the housing adjacent the free-piston.

5. The free-piston engine of claim 1 wherein the means for controlling the compression ratio causes autoignition of the fuel and air mixture in each combustion chamber at a compression ratio ranges from 20:1 to 40:1.

6. The free-piston engine of claim 5 wherein the engine is characterized by a thermal efficiency of greater than about 52%.

7. The free-piston engine of claim 1 wherein the means for causing the fuel and air mixture to react causes at least 95% of the fuel to be combusted in less than about 50 μsec following autoignition.

8. The free-piston engine of claim 1 wherein the source of fuel and air comprises fuel that includes hydrogen, hydrocarbons and mixtures thereof.

9. The free-piston engine of claim 4 wherein the electrical stator is secured to the housing and the permanent magnet is secured to the free-piston.

10. The free-piston engine of claim 1 comprising means for synchronously opening and closing the inlets and outlets to produce a pressure-volume relationship in each of the combustion chambers.

11. A method for generating electrical current that comprises the steps of:

(a) providing a free-piston, two-stroke autoignition internal combustion engine that emits near zero $NO_x$ emissions of less than about 20 ppm comprising:

(i) a housing including a cylinder having first and second combustion chambers at opposite ends thereof, wherein each combustion chamber includes an inlet and outlet;

(ii) a double-ended piston that is displaceable between the first and second combustion chambers;

(iii) a linear alternator means operable with the piston for converting kinetic energy of the piston into electrical energy;

(iv) a source of fuel and air that supplies a fuel and air mixture into each combustion chamber through the inlets;

(v) means for controlling the compression ratio to cause autoignition of the fuel and air mixture in each combustion chamber at a compression ratio of at least about 16:1; and (vi) means for causing the fuel and air mixture to react following autoignition at a combustion rate so that at least 95% of the fuel is combusted in less than about 80 μsec;

(b) operating the engine to generate electric energy wherein the engine emits near zero $NO_x$ emissions of less than about 20 ppm and wherein the engine is characterized by a thermal efficiency of at least about 48%.

12. The method of claim 11 wherein the engine emits near zero $NO_x$ emissions of less than about 5 ppm.

13. The method of claim 11 wherein the source of the fuel and air supplies a fuel and air mixture that has an equivalence ratio that ranges from 0.25 to 0.55.

14. The method of claim 11 wherein the means for controlling the compression ratio causes autoignition of the fuel and air mixture in each combustion chamber at a compression ration of about 25:1 to 35:1.

15. The method of claim 11 wherein the linear alternator means comprises an electrical stator and a permanent magnet, with one of said stator or magnet being secured to the free-piston and the another being secured to the housing adjacent the free-piston.

16. The method of claim 11 wherein the engine is operated at a compression ratio that ranges from 20:1 to 40:1.

17. The method of claim 16 wherein the engine is operated at a thermal efficiency that is greater than about 52%.

18. The method of claim 11 wherein the engine is operated at a combustion rate whereby at least 95% of the fuel is combusted in less than about 50 μsec following autoignition.

19. The method of claim 11 wherein the engine uses fuel that includes hydrogen, hydrocarbons and mixtures thereof.

20. The method of claim 15 wherein the electrical stator is secured to the housing and the permanent magnet is secured to the free-piston.

21. The method of claim 11 wherein step (b) comprises synchronously opening and closing the inlets and outlets to produce a pressure-volume relationship in each of the combustion chambers.

22. In a hybrid vehicle including a frame, wheels, electric motors for driving the wheels, a storage battery for receiving electric current and for energizing the motors, and control means for operating the vehicle and components thereof, the improvement comprises of employing a free-piston engine-alternator for charging the battery, said free-piston engine-alternator emits near zero $NO_x$ emissions of less than about 20 ppm comprising:

a housing including a cylinder having first and second combustion chambers at opposite ends thereof, wherein each combustion chamber includes an inlet and outlet;

a double-ended piston that is displaceable between the first and second combustion chambers;

a linear alternator means operable with the piston for converting kinetic energy of the piston into electrical energy;

a source of fuel and air that supplies a fuel and air mixture into each combustion chamber through the inlets;

means for controlling the compression ratio to cause autoignition of the fuel and air mixture in each combustion chamber at a compression ratio of at least about 16:1; and means for causing the fuel and air mixture to react following autoignition at a combustion rate so that at least 95% of the fuel is combusted in less than about 80 μsec wherein the engine is characterized by a thermal efficiency of at least about 48%.

23. The hybrid vehicle of claim 22 wherein the source of the fuel and air supplies a fuel and air mixture that has an equivalence ratio that ranges from 0.25 to 0.55.

24. The hybrid vehicle of claim 22 wherein the means for controlling the compression ratio causes autoignition of the fuel and air mixture in each combustion chamber at a compression ratio of about 25:1 to 35:1.

25. The hybrid vehicle of claim 22 wherein the linear alternator means comprises an electrical stator and a permanent magnet, with one of the stator and magnet being secured to the free-piston and the another being secured to the housing adjacent the free-piston.

26. The hybrid vehicle of claim 22 wherein the means for controlling the compression ratio causes autoignition of the fuel and air mixture in each combustion chamber at a compression ratio ranges from 20:1 to 40:1.

27. The hybrid vehicle of claim 26 wherein the engine is characterized by a thermal efficiency of greater than about 52%.

28. The hybrid vehicle of claim 22 wherein the means for causing the fuel and air mixture to react causes at least 95% of the fuel to be combusted in less than about 50 μsec following autoignition.

29. The hybrid vehicle of claim 22 wherein the source of fuel and air comprises fuel that includes hydrogen, hydrocarbons and mixtures thereof.

30. The hybrid vehicle of claim 25 wherein the electrical stator is secured to the housing and the permanent magnet is secured to the free-piston.

31. The hybrid vehicle of claim 22 wherein the free-piston engine-alternator comprises means for synchronously opening and closing the inlets and outlets to produce a pressure-volume relationship in each of the combustion chambers.

* * * * *